US010437213B2

(12) United States Patent
Bhai et al.

(10) Patent No.: US 10,437,213 B2
(45) Date of Patent: Oct. 8, 2019

(54) METHODS AND APPARATUSES FOR CONTROLLING ANGULAR ORIENTATIONS OF A PERSON SUPPORT APPARATUS

(71) Applicant: Hill-Rom Services, Inc., Batesville, IN (US)

(72) Inventors: Aziz Ali Bhai, Fishers, IN (US); Charles A. Lachenbruch, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 358 days.

(21) Appl. No.: 15/186,486

(22) Filed: Jun. 19, 2016

(65) Prior Publication Data
US 2016/0367419 A1   Dec. 22, 2016

Related U.S. Application Data

(60) Provisional application No. 62/182,045, filed on Jun. 19, 2015.

(51) Int. Cl.
*G05B 19/042* (2006.01)
*A61G 7/015* (2006.01)
(Continued)

(52) U.S. Cl.
CPC ........... *G05B 19/042* (2013.01); *A61G 7/005* (2013.01); *A61G 7/015* (2013.01); *A61G 7/05738* (2013.01); *A61G 7/0527* (2016.11); *A61G 2203/42* (2013.01); *A61G 2203/44* (2013.01); *G05B 2219/2608* (2013.01)

(58) Field of Classification Search
CPC .......... G05B 19/042; G05B 2219/2608; A61G 7/005; A61G 7/015; A61G 7/05738; A61G 7/0527; A61G 2203/42; A61G 2203/44
See application file for complete search history.

(56) References Cited

U.S. PATENT DOCUMENTS 4,559,656 A   12/1985 Foster
5,205,004 A   4/1993 Hayes et al.
(Continued)

FOREIGN PATENT DOCUMENTS

WO   WO0226187 A2   4/2002

*Primary Examiner* — Brian W Wathen
*Assistant Examiner* — Hung H Dang
(74) *Attorney, Agent, or Firm* — Dinsmore & Shohl LLP

(57) ABSTRACT

A method for controlling an angular orientation of a person support apparatus including a bladder portion containing fluidized particulate material, an upper frame, and a base frame may include adjusting a height of the upper frame with respect to the base frame with at least one of a first and second actuator at respective speeds, determining a dynamic angular orientation of the upper frame with respect to the base frame based on at least one of a respective operating characteristic of the first and second actuator, determining a corrected angular orientation based on the dynamic angular orientation and a floor angle indicative of the orientation of the base frame with respect to horizontal, comparing the corrected angular orientation with an orientation reference range, and adjusting at least one actuator speed when the corrected angular orientation is outside the orientation reference range until it is within the orientation reference range.

20 Claims, 13 Drawing Sheets

(51) Int. Cl.
  *A61G 7/005* (2006.01)
  *A61G 7/057* (2006.01)
  *A61G 7/05* (2006.01)

(56) References Cited

U.S. PATENT DOCUMENTS

| | | | |
|---|---|---|---|
| 5,611,096 A * | 3/1997 | Bartlett | A61G 7/001 |
| | | | 5/424 |
| 6,073,289 A | 6/2000 | Bolden et al. | |
| 6,158,070 A | 12/2000 | Bolden et al. | |
| 6,841,953 B2 | 6/2005 | Bastholm | |
| 7,003,828 B2 | 2/2006 | Roussy | |
| 7,208,896 B2 | 4/2007 | Ford et al. | |
| 7,386,900 B2 | 6/2008 | Lemire | |
| 2001/0052152 A1 * | 12/2001 | Soltani | A61G 7/05746 |
| | | | 5/689 |
| 2005/0223491 A1 * | 10/2005 | McCrimmon | A47C 19/045 |
| | | | 5/11 |
| 2008/0000028 A1 * | 1/2008 | Lemire | A61G 7/001 |
| | | | 5/618 |
| 2008/0289108 A1 * | 11/2008 | Menkedick | A61G 7/0528 |
| | | | 5/610 |
| 2010/0000017 A1 * | 1/2010 | Laloge | A61G 7/005 |
| | | | 5/611 |
| 2011/0231996 A1 * | 9/2011 | Lemire | A61G 7/005 |
| | | | 5/613 |
| 2016/0156391 A1 * | 6/2016 | Fujii | H04B 7/04 |
| | | | 455/63.4 |

\* cited by examiner

TABLE 1

| L=40 | | Slope (lbs./in) 107.29 | Slope (lbs./in) 96.771 | Slope (lbs./in) 96.217 | Slope (lbs./in) 113.35 |
|---|---|---|---|---|---|
| | | Bottoming 9.0": 420 lbs. | Bottoming 9.0": 359 lbs. | Bottoming 9.0": 320 lbs. | Bottoming 9.0": 280 lbs. |
| Δθ | Δ Depth (ins.) | ΔSupport (lbs.) | ΔSupport (lbs.) | ΔSupport (lbs.) | ΔSupport (lbs.) |
| 0 | 0.000 | 0.0 | 0.0 | 0.0 | 0.0 |
| 0.1 | 0.070 | 7.5 | 6.8 | 6.7 | 7.9 |
| 0.2 | 0.140 | 15.0 | 13.5 | 13.4 | 15.8 |
| 0.3 | 0.209 | 22.5 | 20.3 | 20.2 | 23.7 |
| 0.4 | 0.279 | 30.0 | 27.0 | 26.9 | 31.7 |
| 0.5 | 0.349 | 37.4 | 33.8 | 33.6 | 39.6 |
| 0.6 | 0.419 | 44.9 | 40.5 | 40.3 | 47.5 |
| 0.7 | 0.489 | 52.4 | 47.3 | 47.0 | 55.4 |
| 0.8 | 0.558 | 59.9 | 54.0 | 53.7 | 63.3 |
| 0.9 | 0.628 | 67.4 | 60.8 | 60.4 | 71.2 |
| 1 | 0.698 | 74.9 | 67.6 | 67.2 | 79.1 |
| 1.1 | 0.768 | 82.4 | 74.3 | 73.9 | 87.0 |
| 1.2 | 0.838 | 89.9 | 81.1 | 80.6 | 94.9 |
| 1.3 | 0.907 | 97.4 | 87.8 | 87.3 | 102.9 |
| 1.4 | 0.977 | 104.8 | 94.6 | 94.0 | 110.8 |
| 1.5 | 1.047 | 112.3 | 101.3 | 100.7 | 118.7 |
| | | HOB=0 | HOB=30 | HOB=45 | HOB=60 |

FIG. 15

TABLE 2

| HOB angle | | Slope (ins./lb.) | | Intercept (ins.) |
|---|---|---|---|---|
| 0 | Depth = | 0.00932 | * weight (lbs.) | 5.1345 |
| 30 | Depth = | 0.01033 | * weight (lbs.) | 5.3460 |
| 45 | Depth = | 0.01040 | * weight (lbs.) | 5.6548 |
| 60 | Depth = | 0.00883 | * weight (lbs.) | 6.4607 |
| | Mean Slope | 0.00972 | | |

FIG. 16

TABLE 3

| Weight (lbs.) | HOB (degrees) | Calc Depth (in.) | Depth from Regressions (in.) | ~ error % |
|---|---|---|---|---|
| 200 | 0 | 6.898 | 7 | 1.47% |
| 200 | 30 | 7.5055 | 7.41 | 1.28% |
| 200 | 45 | 7.80925 | 7.73 | 1.02% |
| 200 | 60 | 8.113 | 8.22 | 1.31% |
| 300 | 0 | 7.87 | 7.93 | 0.76% |
| 300 | 30 | 8.4775 | 8.45 | 0.32% |
| 300 | 45 | 8.78125 | 8.78 | 0.01% |
| 300 | 60 | 9.085 | 9.25 | 1.80% |

FIG. 17

METHODS AND APPARATUSES FOR CONTROLLING ANGULAR ORIENTATIONS OF A PERSON SUPPORT APPARATUS

CROSS REFERENCE To RELATED APPLICATIONS

The present specification claims priority to U.S. Provisional Patent Application Ser. No. 62/182,045, filed Jun. 19, 2015 and entitled "METHODS AND APPARATUSES FOR CONTROLLING ANGULAR ORIENTATIONS OF A PERSON SUPPORT APPARATUS," the entirety of which is incorporated by reference herein.

TECHNICAL FIELD

The present specification generally relates to person support apparatuses for use in healthcare facilities and, more specifically, to person support apparatuses with angular orientation control systems and methods for operating the same.

BACKGROUND

Individuals in health care facilities may rest on person support apparatuses that include mattress replacement systems having bladders containing particulate material. Varying weights across such individuals may affect a distribution of the particulate material, such as during seating and/or during raising or lowering a height of such person support apparatuses.

Accordingly, a need exists for alternative methods for controlling and adjusting the angular orientation of portions of the person support apparatuses, whereby a desired distribution of the particulate materials is maintained.

SUMMARY

In one embodiment, a method for controlling an angular orientation of a person support apparatus including a support surface having a bladder portion containing fluidized particulate material, an upper frame, and a base frame may include adjusting a height of the upper frame with respect to the base frame with at least one of a first actuator and a second actuator at respective first and second actuator speeds. The method may further include determining a dynamic angular orientation of the upper frame with respect to the base frame based on at least one of an operating characteristic of the first actuator and an operating characteristic of the second actuator, and determining a corrected angular orientation based on the dynamic angular orientation and a floor angle indicative of the orientation of the base frame with respect to horizontal. The method may further include comparing the corrected angular orientation with an orientation reference range, and adjusting at least one of the first actuator speed and the second actuator speed when the corrected angular orientation is outside the orientation reference range until the corrected angular orientation is within the orientation reference range.

In another embodiment, a method for controlling an angular orientation of a person support apparatus that includes a support surface having a bladder portion containing fluidized particulate material may include actuating at least one of a first actuator and a second actuator, respectively coupled to the person support apparatus at a first end and a second end, at a respective first actuator speed and a second actuator speed to raise or lower a height of the person support apparatus, and receiving a first reading indicative of a first angular orientation of the first end of the person support apparatus with respect to the second end and relative to horizontal. The first reading may be at least generated from a first sensor and a second sensor respectively associated with the first actuator and the second actuator. The method may further include determining a corrected first reading indicative of the first angular orientation based on the first reading and a calibration of the person support apparatus, comparing the corrected first reading and an orientation reference range, and actuating at least one of the first actuator and the second actuator automatically at a different speed when the corrected first reading is outside the orientation reference range until an adjusted corrected first reading indicative of an adjusted first angular orientation is within the orientation reference range.

In yet another embodiment, a system for controlling an angular orientation of a person support apparatus may include at least a first actuator associated with a head end as a first end and a second actuator associated with a foot end as a second end of the person support apparatus, and an electronic control unit comprising a processor communicatively coupled to a non-transitory computer storage medium. The non-transitory computer storage medium stores instructions that may, when executed by the processor, cause the processor to: actuate at least one of the first actuator and the second actuator at a respective first actuator speed and a second actuator speed to raise or lower a height of the person support apparatus, and receive, automatically with the electronic control unit, a first reading indicative of a first angular orientation of the first end of the person support apparatus with respect to the second end and relative to horizontal, wherein the first reading is generated from a first sensor and a second sensor respectively associated with the first actuator and the second actuator. The non-transitory computer storage medium stores instructions that may, when executed by the processor, further cause the processor to: determine, automatically with the electronic control unit, a corrected first reading indicative of the first angular orientation based on the first reading and a calibration of the person support apparatus, compare, automatically with the electronic control unit, the corrected first reading and an orientation reference range, and actuate at least one of the first actuator and the second actuator, automatically with the electronic control unit, at a different speed when the corrected first reading is outside the orientation reference range until an adjusted corrected first reading indicative of an adjusted first angular orientation is within the orientation reference range.

In yet another embodiment, a method for controlling an angular orientation of a person support apparatus including a base frame, an upper frame positioned on the base frame, a support surface having a bladder portion containing fluidized particulate material positioned on the upper frame, and a torso frame positioned on the upper frame may include receiving a head of bed (HOB) angle indicative of an angular orientation of the torso frame with respect to the upper frame, and receiving a weight of a person positioned on the person support apparatus. The method may further include determining a tilt angle of the upper frame with respect to the base frame based on the HOB angle and the weight of the person positioned on the person support apparatus, and adjusting an angular orientation of the upper frame with respect to the base frame until the upper frame is oriented at the tilt angle with respect to the base frame. The tilt angle may correspond to a minimum depth of the fluidized particulate material at a point of maximum immersion of the person on the bladder portion of the support surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 15 illustrates an example TABLE 1 setting forth data with respect to different HOB angles and the resultant maximum supportable weights for different tilt angles of the support surface;

FIG. 16 illustrates an example TABLE 2 setting forth mean slope data at least partially based on the linear relationships of FIGS. 10-14, according to one or more embodiments described herein; and FIG. 17 illustrates an example TABLE 3 setting forth data calculated with EQUATION 1 to estimate depth of immersion in inches as a function of HOB and person weight along with a comparison to empirically derived data.

DETAILED DESCRIPTION

A person support apparatus may include a support surface having a bladder portion containing particulate material and a fluidization system for injecting fluid into the bladder portion and fluidizing the particulate material. An electronic control unit may control the angular orientation of one or more ends of the person support apparatus such that the fluidized particulate material contained within the bladder portion of the person support apparatus is distributed in the bladder portion. Otherwise, if the fluidized particulate material does not remain distributed when the person support apparatus is moved upwards or downwards, for example, the fluidized particulate material might migrate due to a gravitational pull toward an end of the person support apparatus, such as when the person support apparatus is placed upon on an angled floor causing a person resting on the support surface to be inadequately supported. As will be described in greater detail herein, factors that may affect such migration and a maximum amount of weight that the fluidized particulate material may support include a tilt angle associated with the support surface.

The methods and apparatuses described herein may be used to maintain a person support apparatus within an orientation reference range as the height of the person support apparatus is adjusted so that the fluidized particulate material contained within the bladder portion of the person support apparatus has a desired distribution during and after the height adjustments. Methods and apparatuses for controlling angular orientations of person support apparatuses, such as in acute care settings, to maintain the fluidized particulate material in a specific distribution in the bladder portion during movement of the person support apparatus are further described herein with specific reference to the appended drawings.

Figure 1:
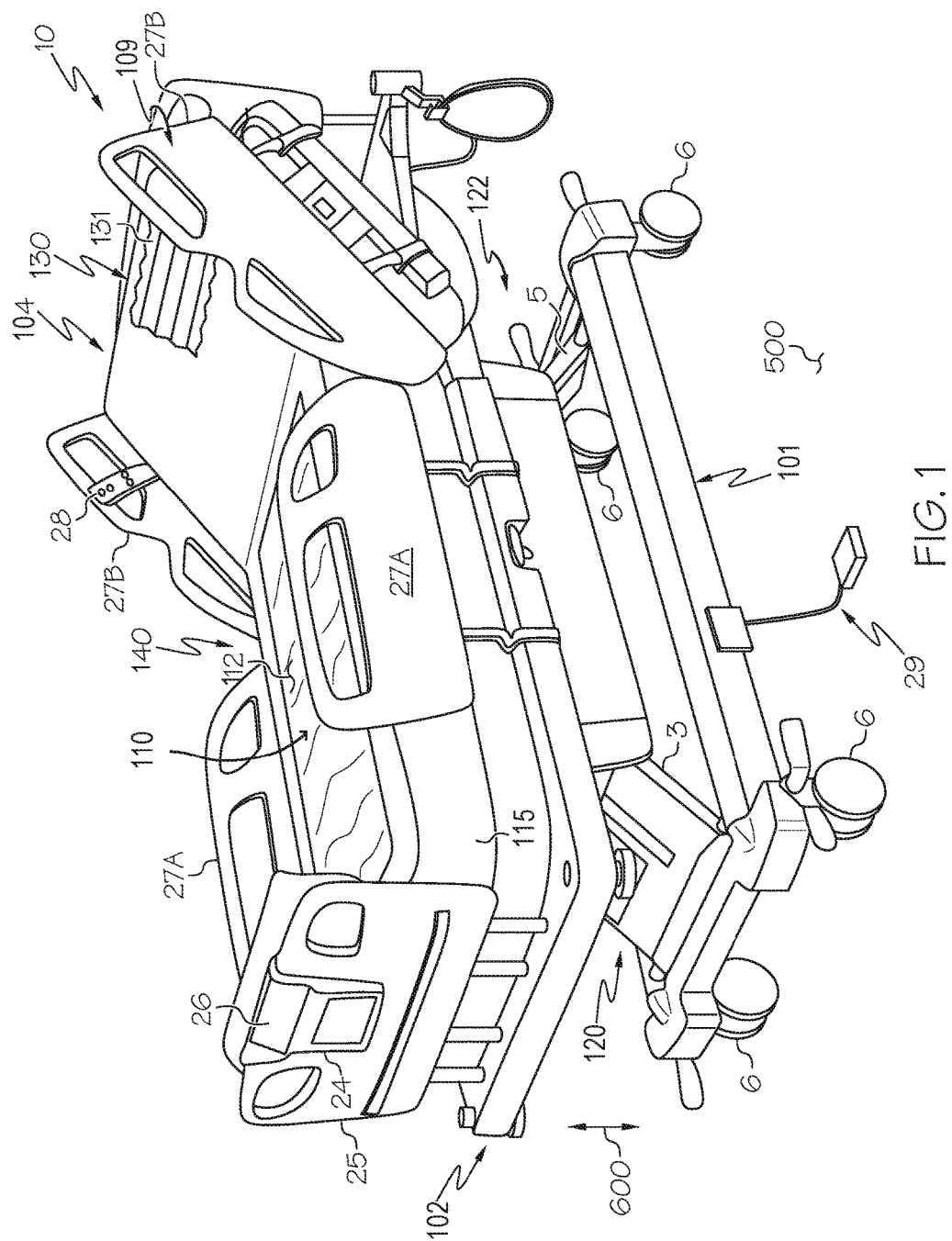
FIG. 1 schematically depicts a person support apparatus, according to one or more embodiments shown and described herein.

FIG. 1 schematically depicts one embodiment of a person support apparatus 10 with an angular orientation control system which may be used in, for example, an acute care setting, such as a hospital. The person support apparatus 10, for example, may be a person support apparatus similar to the HILL-ROM® CLINITRON® RITE HITE® Air Fluidized Therapy bed or the HILL-ROM® ENVELLA™ Air Fluidized Therapy System bed, which are commercially available from Hill-Rom Services, Inc. of Batesville, Ind. However, it should be understood that other person support apparatuses compatible with the methods described herein are contemplated and possible.

The person support apparatus 10 generally includes a base frame 101 and an upper frame 102 on which a mattress system 104 is supported. The base frame 101 supports the person support apparatus 10 on the floor 500 and may include wheels 6, such as casters, to facilitate relocating and/or repositioning the person support apparatus 10 on the floor 500. The upper frame 102 is coupled to the base frame 101 with pivoting linkages 3, 5 which facilitate raising and lowering (e.g., transitioning) the upper frame 102 with respect to the base frame 101 as indicated by arrow 600 and described in greater detail herein. More particularly, a first end of linkage 3 is pivotally coupled to the base frame 101 and a second end of linkage 3 is pivotally coupled to the upper frame 102. Similarly, a first end of linkage 5 is pivotally coupled to the base frame 101 and a second end of linkage 5 is pivotally coupled to the upper frame 102.

Still referring to FIG. 1, in embodiments, the person support apparatus 10 may include a torso frame 109 which is pivotally coupled to the upper frame 102. The torso frame 109 may be pivoted with respect to the upper frame 102 thereby facilitating increasing an angle of inclination of the mattress system 104 proximate the head end 122 of the person support apparatus 10. In embodiments, a torso actuator 95 (FIG. 2) may be coupled to the upper frame 102 and the torso frame 109 to facilitate pivoting the torso frame 109 with respect to the upper frame 102 via an electronic control unit. The mattress system 104 includes an upper portion 130 and a lower portion 140. The upper portion 130 of the mattress system 104 is positioned on the torso frame 109. In some embodiments, the upper portion 130 of the mattress system 104 may generally include one or more fluid bladders 131 which may be inflated or deflated to adjust the position of a person on the mattress system 104 and/or increase or decrease the firmness of a portion of the mattress system 104 according to the person's preference.

Further, the lower portion 140 the mattress system 104 of the person support apparatus 10 includes a fluidized bed 112 of particulate material contained within a bladder portion 110 positioned in a tub portion 115. The particulate material may be, for example, microspheres (i.e., beads) formed from glass, plastic, and/or ceramic materials. A fluidization system (not shown), such as a pump, may be used to pump a fluid, such as a gas or air, into the particulate material contained within the bladder portion, thereby fluidizing the particulate material and creating the fluidized bed 112 in the lower portion 140 of the mattress system 104. The fluidized bed 112 assists in distributing and redistributing pressure against the skin of a person positioned on the mattress system 104.

In embodiments, the person support apparatus 10 further includes a control box 24 and an angle and height control panel 26. In the embodiment shown in FIG. 1, the control box 24 and the control panel 26 are located on a footboard 25 coupled to the upper frame 102 at the foot end 120 of the person support apparatus 10. The person support apparatus 10 also includes side rails 27A, 27B coupled to the upper frame 102 along the sides of the mattress system 104 between the foot end 120 and the head end 122 of the person support apparatus 10. A side rail 27B may include a pendant 28 to further provide person-accessible control features to a user to allow for adjustment of the person support apparatus 10, as described in greater detail herein. The person support apparatus may further include a foot control 29 for controlling certain functions of the person support apparatus 10 including, without limitation, raising and/or lowering of the person support apparatus 10.

Figure 2:
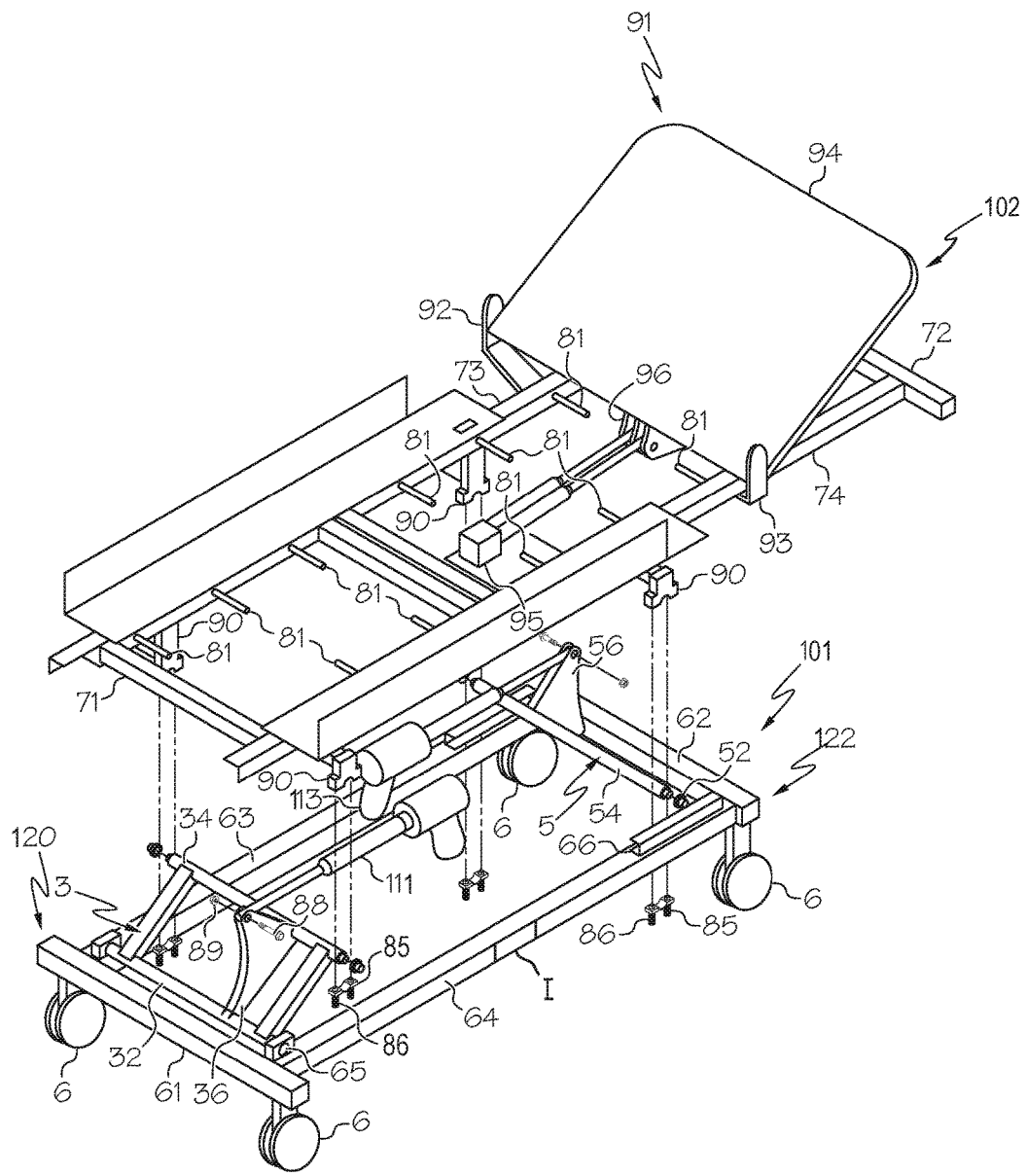
FIG. 2 schematically depicts an exploded view showing the upper frame and the lower frame of the person support apparatus of FIG. 1, according to one or more embodiments shown and described herein.

Referring now to FIG. 2, an exploded view of the upper frame 102 and base frame 101 of the person support apparatus 10 of FIG. 1 is schematically depicted. As depicted in FIG. 2, the person support apparatus 10 also includes actuators 111, 113 (i.e., foot actuator 111 and head actuator 113) which raise and/or lower the upper frame 102 with respect to the base frame 101 when actuated by an electronic control unit communicatively coupled to the actuators 111, 113, such as the control box 24. In the embodiments described herein, the actuators 111, 113 are linear actuators. However, it should be understood that other actuators are contemplated and possible including, without limitation, pneumatic actuators, hydraulic actuators, rotary actuators (e.g., motors), and the like.

In embodiments, person support apparatus 10 may include frame angular orientation sensor(s) for determining the angular orientation of the upper frame 102 with respect to the base frame 101. For example, in embodiments, orientation sensor(s) may include potentiometers (not shown) operatively associated with each of the foot actuator 111 and the head actuator 113. The potentiometers are communicatively coupled to the control box 24 of the person support apparatus 10, either by wires or wirelessly, and transmit signals to the control box 24 indicative of, for example, the stroke length of the foot actuator 111 and the head actuator 113 which, in turn, can be correlated to the angular orientation and height of the upper frame 102 with respect to the base frame 101 such as in a look up table (LUT) stored in a memory of the control box. For example, the LUT may contain an array of angular orientations (in degrees))(° of the upper frame 102 with respect to the base frame 101 that are indexed according to the value of the signals output by the potentiometers operatively associated with each of the foot actuator 111 and the head actuator 113. Additionally, the LUT may contain an array of distances indicating the spacing between the upper frame 102 and the base frame 101 indexed according to the value of the signals output by the potentiometers operatively associated with each of the foot actuator 111 and the head actuator 113. In embodiments, the distances may also be indexed according to the angle between the upper frame 102 and the base frame 101.

In embodiments, the upper frame 102 includes an end rail 71 proximate the foot end 120 and an end rail 72 proximate the head end 122, and side rails 73, 74 disposed between and coupled to the end rail 71 and the end rail 72. The upper frame 102 includes cable tie locking mounts 81 and upper pivot projection features 90 that project from side rails 73, 74. Similarly, the base frame 101 includes an end rail 61 proximate the foot end 120 and an end rail 62 proximate the head end 122, and sides rails 63, 64 disposed between and coupled to the end rail 61 and the end rail 62. In embodiments, the base frame 101 further includes one or more sensors for detecting and determining a load applied to the person support apparatus 10 such as, for example, the weight of a person positioned on the person support apparatus 10. In embodiments, the one or more sensors may include load beams (not shown) disposed within the side rails 63, 64 of the base frame 101. In other embodiments, the one or more sensors may include load cells (not shown) disposed within the side rails 63, 64 of the base frame 101. The one or more sensors may be communicatively coupled to a control box 24 of the person support apparatus 10, either by wires or wirelessly, and transmit a signal to the control box indicative of the weight of a person positioned on the person support apparatus 10. The base frame 101 may also include an angular orientation sensor, such as an inclinometer I, attached to or integrated in one of the side rails 63, 64. The inclinometer I may be communicatively coupled to a control box 24 of the person support apparatus 10, either by wires or wirelessly, and transmits a signal to the control box 24 indicative of the angular orientation of the person support apparatus 10 with respect to horizontal level.

The base frame 101 further includes a linkage 3 (i.e., a foot linkage 3) pivotally coupled to the base frame 101 proximate the foot end 120. The foot linkage 3 is also pivotally coupled to the upper frame 102 and facilitates raising and lowering the foot end 120 of the upper frame 102 with respect to the base frame 101. Specifically, a first end 32 of the foot linkage 3 is pivotally coupled to the base frame 101 between the side rails 63, 64. A second end 34 of the foot linkage 3 is pivotally coupled to the upper frame 102 between side rails 73, 74. For example, the second end 34 is received within pivot projection features 90 (e.g., half of a bearing) extending from each of the side rails 73, 74 and a pivot strap 85 (e.g., half of a bearing) that is joined to each pivot projection feature 90 via fasteners 86. In embodiments, the ends of the foot linkage 3 may be disposed in bearing blocks 65 attached to the base frame 101.

As shown in FIG. 2, the foot linkage 3 may further include a yoke 36 coupling the foot actuator 111 to the foot linkage 3. The yoke 36 may be disposed between ends 32, 34 of the foot linkage 3 and includes a pair of walls defining an actuator receiving space therebetween configured to receive and be pivotally coupled to (through a fastener 88, for example) an end of the foot actuator 111.

The base frame 101 further includes a linkage 5 (i.e., a head linkage 5) pivotally coupled to the base frame 101 proximate the head end 122. The head linkage 5 is also pivotally coupled to the upper frame 102 and facilitates raising and lowering the head end 122 of the upper frame 102 with respect to the base frame 101. Specifically, a first end 52 of the head linkage 5 is pivotally coupled to the base frame 101 between side rails 63, 64 proximate the head end 122 of the base frame 101. In embodiments, the first end 52 of the head linkage 5 may be engaged with guide channels 66 attached to the side rails 63, 64 of the base frame 101 such that a first end of the head linkage 5 is slidable with respect to the base frame 101. A second end 54 of the head linkage 5 is pivotally coupled to the upper frame 102 between side rails 73, 74 proximate the head end 122 of the upper frame 102. In embodiments, the second end 54 of the head linkage 5 is received within pivot projection features 90 (e.g., half of a bearing) extending from each of the side rails 73, 74 and a pivot strap 85 (e.g., half of a bearing) that is joined to each pivot projection feature 90 via fasteners 86.

As shown in FIG. 2, the head linkage 5 may further include a yoke 56 coupling the head actuator 113 to the head linkage 5. The yoke 56 may be disposed between ends 52, 54 of the head linkage 5 and may include a pair of walls defining an actuator receiving space therebetween configured to receive and be pivotally coupled to an end of the actuator 113.

In the embodiments described herein, the head actuator 113 and the foot actuator 111 may be, for example, pivotally mounted to the base frame 101 to enable raising or lowering the upper frame 102 with respect to the base frame 101. Alternatively, the head actuator 113 and the foot actuator 111 may be pivotally mounted to the upper frame 102 to enable raising or lowering the upper frame 102 with respect to the base frame 101. In yet another embodiment, at least one of the head actuator 113 and the foot actuator 111 may be pivotally mounted to the upper frame 102 and the other of the head actuator 113 and the foot actuator 111 may be pivotally mounted to the base frame 101.

Still referring to FIG. 2, actuation of the head actuator 113 may thus result in a hi-lo (or upper/lower movement) of the upper frame 102 with respect to the base frame 101 at the head end 122, and actuation of the foot actuator 111 may result in a hi-lo movement of the upper frame 102 with respect to the base frame 101 at the foot end 120. That is, actuation of the foot actuator 111 causes the foot linkage 3 to pivot with respect to the upper frame 102 and the base frame 101, thereby raising or lowering the foot end 120 of the upper frame 102 with respect to the base frame 101. Accordingly, it should be understood that the foot actuator 111 facilitates raising and lowering the foot end 120 of the person support apparatus 10. Similarly, actuation of the head actuator 113 causes the head linkage 5 to pivot with respect to the upper frame 102 and the base frame 101, thereby raising or lowering the head end 122 of the upper frame 102 with respect to the base frame 101. Accordingly, it should be understood that the head actuator 113 facilitates raising and lowering the head end 122 of the person support apparatus 10. Based on the foregoing, it should be understood that the foot actuator 111 and the head actuator 113 may be utilized to adjust the height of the upper frame 102 with respect to the base frame 101 and the floor 500 (FIG. 1). It should also be understood that the foot actuator 111 and the head actuator 113 may be operated independently or in conjunction with one another to adjust the angular orientation of the upper frame 102 (by controlling heights of ends 120, 122 with respect to one another and relative to horizontal, for example) with respect to the base frame 101 and the floor 500.

As depicted in FIG. 2, the person support apparatus 10 further includes a torso support section 91 as part of the torso frame 109 (FIG. 1). The torso support section 91 is pivotally coupled to the upper frame 102 proximate the head end 122 of the upper frame 102. In embodiments, the torso support section 91 includes a deck 94 that is pivotally coupled to the upper frame 102 with support brackets 92, 93 attached to the side rails 73, 74 of the upper frame 102. The deck 94 further comprises a yoke 96 coupled to an underside of the deck 94, such as to a frame structure (not shown) disposed on the underside of the deck 94. The torso support section 91 also includes a torso actuator 95 that is pivotally coupled to the deck 94 with the yoke 96 and affixed to a portion of the upper frame 102. The torso actuator 95 may also be communicatively coupled to an electronic control unit, such as the control box 24, which may be used to actuate the torso actuator 95. Actuation of the torso actuator 95 causes the deck 94 to pivot with respect to the support brackets 92, 93 and the upper frame 102, thereby changing the angular orientation of the deck 94 with respect to the upper frame 102.

In embodiments, the torso support section 91 of the person support apparatus 10 includes an orientation sensor (not shown) for determining the angular orientation of the deck 94 of the torso support section 91 relative to the upper frame 102. In embodiments, the orientation sensor may be, for example, an inclinometer affixed to an underside of the deck 94. The inclinometer may be communicatively coupled to a control box of the person support apparatus 10, either by wires or wirelessly, and transmits a signal to the control box indicative of the angle of inclination of the deck 94 with respect to the upper frame 102. In some other embodiments, the orientation sensor may include a potentiometer (not shown) operatively associated with the torso actuator 95. The potentiometer is communicatively coupled to a control box of the person support apparatus 10, either by wires or wirelessly, and transmits a signal to the control box indicative of, for example, the stroke length of the torso actuator 95 which, in turn, can be correlated to the angular orientation of the deck 94 with respect to the upper frame 102 such as in a look up table (LUT) stored in a memory of the control box.

Figure 3:
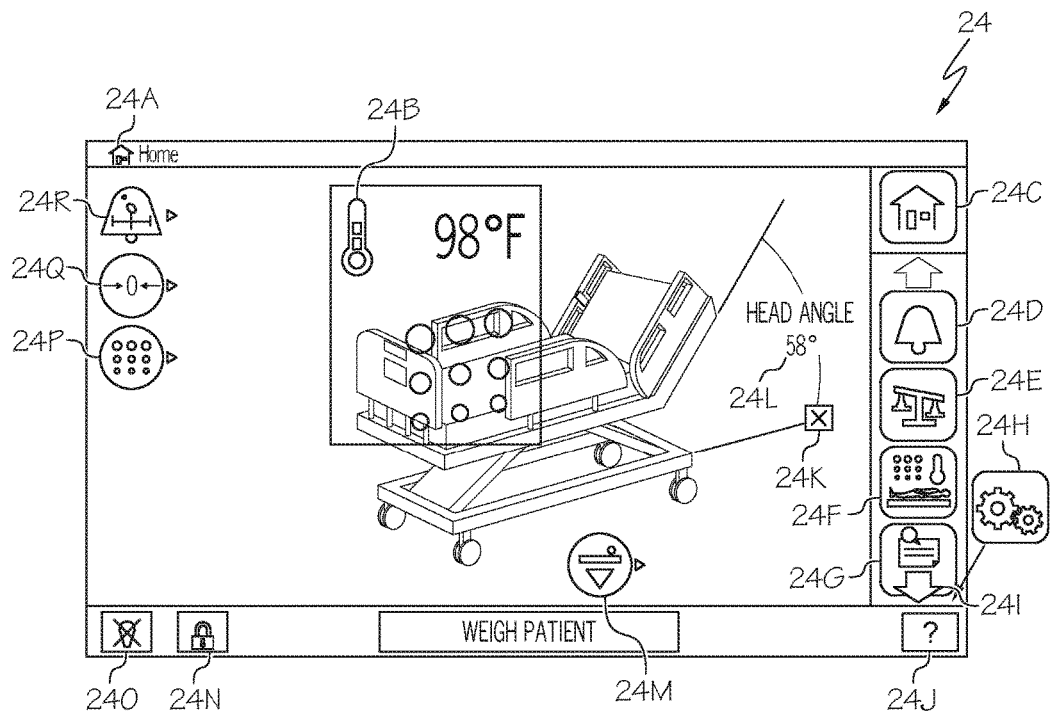
FIG. 3 schematically depicts an exemplary control box of the person support apparatus of FIG. 1, according to one or more embodiments shown and described herein.

Referring now to FIGS. 1-3, the control box 24 of the person support apparatus of FIG. 1 is schematically depicted. In embodiments, the control box 24 includes a processor and a non-transitory computer storage medium storing computer readable and executable instructions which, when executed by the processor, control the functions of the person support apparatus 10. In embodiments, the control box 24 further includes a graphical user interface (GUI) as depicted in FIG. 3. The GUI associated with the control box 24 may be a Graphical Caregiver Interface ("GCI®") commercially available from Hill-Rom Services, Inc. of Batesville, Ind., for example. A user, such as a caregiver, may be able to adjust the angular orientation of the upper frame 102 of the person support apparatus 10 and move the upper frame 102 in upwards and downwards directions (indicated by arrow 600) relative to the base frame 101 via a soft key or button provided on the GUI of control box 24. The GUI of the control box 24 may include, for example, a home screen indicator 24A, one or more temperature status indicators 24B of a surface of the bladder portion, a home menu control option 24C, an alerts menu control option 24D, and a scale menu control option 24E to weigh a person supported on the person support apparatus 10, for example. The GUI of the control box 24 may further include a bed therapy menu control option 24F, a reminder menu control option 24G, a preferences menu control option 24H, a down (and up) arrow menu control option 24I, and a help control option 24J. Further, the GUI of the control box 24 may graphically provide a head angle alert status indicator 24K, a head angle orientation indicator 24L showing an angle of the torso frame 109 with respect to the upper frame 102 (shown as 58° in the example of FIG. 3), a bed height status indicator 24M, and a screen lock control option 24N. The GUI of the control box 24 may further include an air fluidization status indicator 24P, a scale zero status indicator 24Q, a bed exit alert status indicator 24R, and an alternative preemptive bed exit alert silence control option 24O. Other control features and options accessible to a caregiver via the GUI of the control box 24 to control and/or collect data with respect to the person support apparatus 10 are contemplated and are within the scope of this disclosure.

Figure 4:
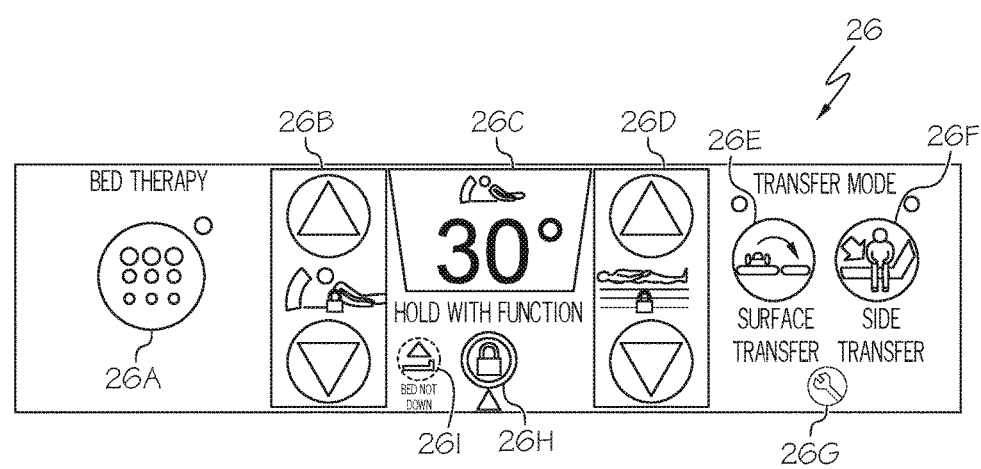
FIG. 4 schematically depicts an exemplary angle and height control panel of the person support apparatus of FIG. 1, according to one or more embodiments shown and described herein.
Figure 5:
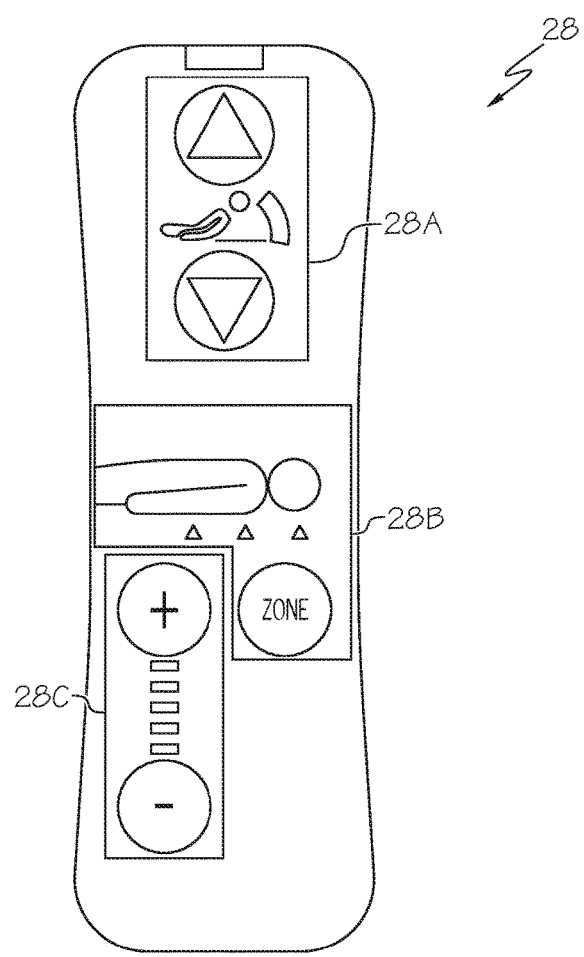
FIG. 5 schematically depicts an exemplary pendant of the person support apparatus of FIG. 1, according to one or more embodiments shown and described herein.

Other types of control panels, pendants, and/or control units for controlling the person support apparatus 10 are also contemplated. For example, FIG. 4 schematically depicts the angle and height control panel 26 of the person support apparatus of FIG. 1, and FIG. 5 schematically depicts the pendant 28 of the person support apparatus of FIG. 1. The control panel 26 may be, for example, communicatively coupled to the processor and non-transitory computer storage medium of the control box 24 to facilitate the operation of various functions of the person support apparatus 10. The control panel 26 of FIG. 4 may include a bed therapy (air fluidization) control and indicator option 26A, head up and down controls 26B with a lockout indicator, a head angle display 26C (shown as 30° in the example of FIG. 4), and bed up and down controls 26D with a lockout indicator. The bed up and down controls 26D may be used to raise or lower the upper frame 102 via the foot and head actuators 111, 113, as described above. The control panel 26 may further include a surface transfer control 26E, a side transfer control 26F, and a service required indicator 26G. Additionally, the control panel 26 may include a lockout control option 26H and a bed not down indicator 26I (indicating an elevated or raised upper frame 102, for example).

The pendant 28 depicted in FIG. 5 may be, for example, communicatively coupled to the processor and non-transitory computer storage medium of the control box 24 to facilitate the operation of various functions of the person support apparatus 10. The pendant 28 may include head up and down controls 28A to control the angle of the torso frame 109 with respect to the upper frame 102, a comfort adjust zone select control 28B including indicators aligned with certain portions of a resting person, and comfort adjust pressure increase and decrease controls 28C and associated indicators which may be used, for example, to adjust the pressure in the fluid bladders 131 located in the upper portion 130 of the mattress system 104.

Figure 6:
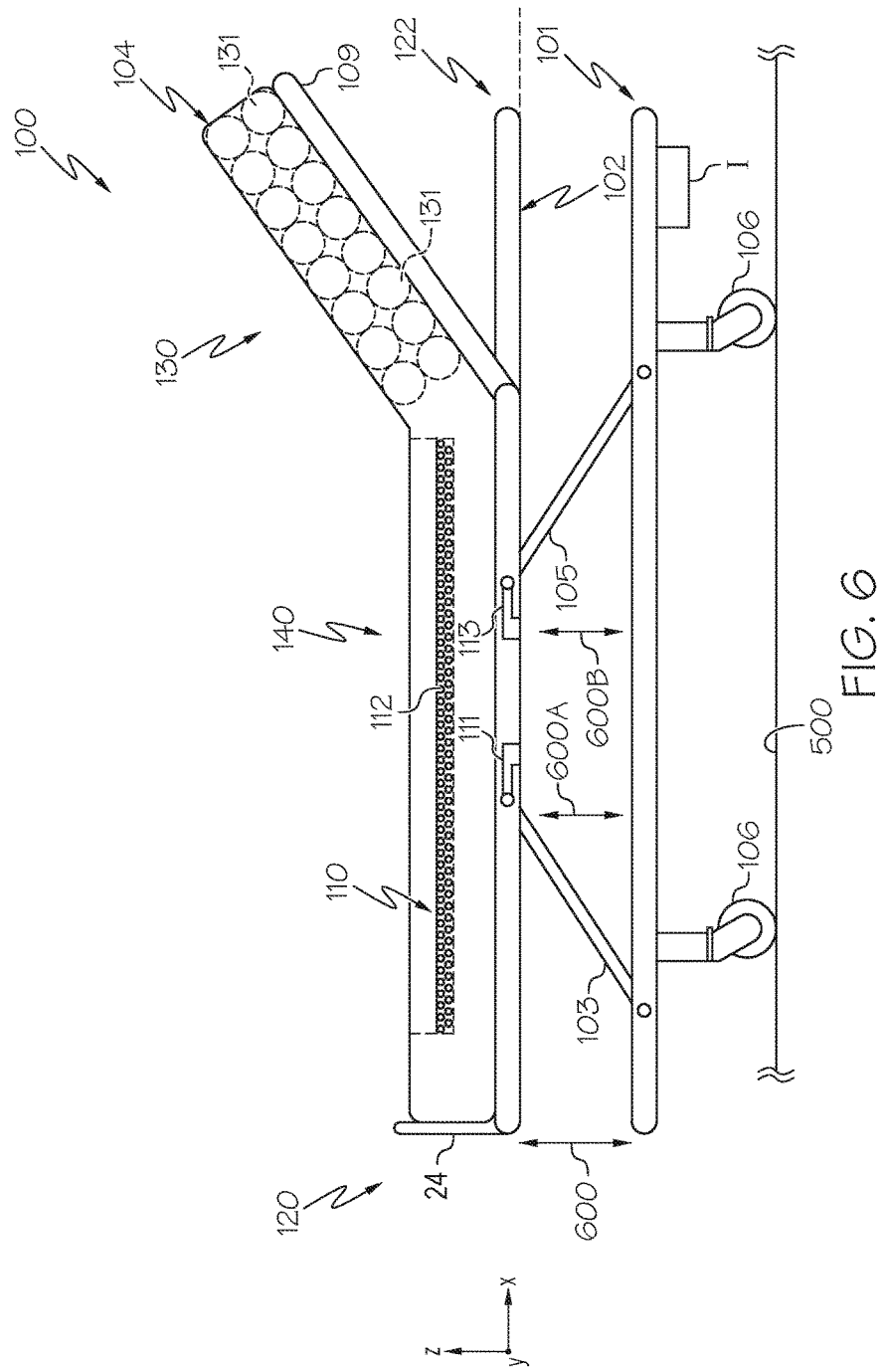
FIG. 6 schematically depicts another person support apparatus, according to one or more embodiments shown and described herein.

Referring now to FIG. 6, another embodiment of a person support apparatus 100 is schematically depicted. The person support apparatus 100 of this embodiment, for example, may be similar to the person support apparatus 10 of FIGS. 1 and 2. It should be understood that other person support apparatuses compatible with the methods described herein are contemplated and possible. In this embodiment, the person support apparatus 100 includes actuators 111, 113 similar to actuators 111, 113 of the person support apparatus 10 of FIGS. 1 and 2 and that allow for an upward or downward movement along arrows 600A, 600B respectively. The person support apparatus 100 further includes an inclinometer I.

The person support apparatus 100 in this embodiment generally includes a base frame 101 and an upper frame 102 on which a mattress system 104 is supported. The base frame 101 supports the person support apparatus 100 on the floor 500 and may include wheels 106 (such as casters) to facilitate relocating and/or repositioning the person support apparatus 100 on the floor 500. The upper frame 102 is coupled to the base frame 101 with pivoting linkages 103, 105 which facilitate raising and lowering the upper frame 102 with respect to the base frame 101, as indicated by arrow 600. More particularly, a first end of a foot linkage 103 is pivotally coupled to the base frame 101 and a second end of the foot linkage 103 is pivotally coupled to the upper frame 102. Similarly, a first end of a head linkage 105 is pivotally coupled to the base frame 101 and a second end of the head linkage 105 is pivotally coupled to the upper frame 102.

In addition, the person support apparatus 100 also includes actuators 111, 113 which, when actuated by an electronic control unit (not shown) communicatively coupled to the actuators 111, 113, raise and/or lower the upper frame 102 with respect to the base frame 101. In the embodiments described herein, the actuators 111, 113 are linear actuators. However, it should be understood that other actuators are contemplated including, without limitation, pneumatic actuators, hydraulic actuators, rotary actuators (e.g., motors), and the like. Actuation of the foot actuator 111 causes the foot linkage 103 to pivot with respect to the upper frame 102 and the base frame 101, thereby raising or lowering the foot end 120 of the upper frame 102 with respect to the base frame 101. Accordingly, it should be understood that the foot actuator 111 facilitates raising and lowering the foot end 120 of the person support apparatus 100. Actuation of the head actuator 113 causes the head linkage 105 to pivot with respect to the upper frame 102 and the base frame 101, thereby raising or lowering the head end 122 of the upper frame 102 with respect to the base frame 101. Accordingly, it should be understood that the head actuator 113 facilitates raising and lowering the head end 122 of the person support apparatus 100. Based on the foregoing, it should be understood that the foot actuator 111 and the head actuator 113 may be utilized to adjust the height of the upper frame 102 with respect to the base frame 101 and the floor 500. It should also be understood that the foot actuator 111 and the head actuator 113 may be used to adjust the angular orientation of the upper frame 102 with respect to the base frame 101 and the floor 500 about an axis of rotation which is generally parallel to the y axis of the coordinate axes depicted in FIG. 6. That is, the foot actuator 111 and the head actuator 113 may be operated independently or in conjunction with one another to adjust the angular orientation of the upper frame 102 with respect to the base frame 101 and the floor 500.

In embodiments, person support apparatus 100 may include frame angular orientation sensor(s) for determining the angular orientation of the upper frame 102 with respect to the base frame 101. For example, in embodiments, orientation sensor(s) may include potentiometers (not shown) operatively associated with each of the foot actuator 111 and the head actuator 113. The potentiometers are communicatively coupled to the control box 24 of the person support apparatus 100, either by wires or wirelessly, and transmit signals to the control box 24 indicative of, for example, the stroke length of the foot actuator 111 and the head actuator 113, which, in turn, can be correlated to the angular orientation and height of the upper frame 102 with respect to the base frame 101 such as in a look up table (LUT) stored in a memory of the control box 24. For example, the LUT may contain an array of angular orientations (in degrees (°) of the upper frame 102 with respect to the base frame 101 that are indexed according to the value of the signals output by the potentiometers operatively associated with each of the foot actuator 111 and the head actuator 113. Additionally, the LUT may contain an array of distances indicating the spacing between the upper frame 102 and the base frame 101 indexed according to the value of the signals output by the potentiometers operatively associated with each of the foot actuator 111 and the head actuator 113. In embodiments, the distances may also be indexed according to the angle between the upper frame 102 and the base frame 101.

Still referring to FIG. 6, in embodiments, the person support apparatus 100 may include a torso frame 109 which is pivotally coupled to the upper frame 102. The torso frame 109 may be pivoted with respect to the upper frame 102 thereby facilitating increasing an angle of inclination of the mattress system 104 proximate the head end 122 of the person support apparatus 100. In embodiments, an actuator (not shown) may be coupled to the upper frame 102 and the torso frame 109 to facilitate pivoting the torso frame 109 with respect to the upper frame 102 via an electronic control unit.

The mattress system 104 includes an upper portion 130 and a lower portion 140. The upper portion 130 of the mattress system 104 is positioned on the torso frame 109. In some embodiments, the upper portion 130 of the mattress system 104 may generally include one or more fluid bladders 131 which may be inflated or deflated to adjust the position of a person on the mattress system 104 and/or increase or decrease the firmness of a portion of the mattress system 104 according to the person's preference.

Figure 7A:
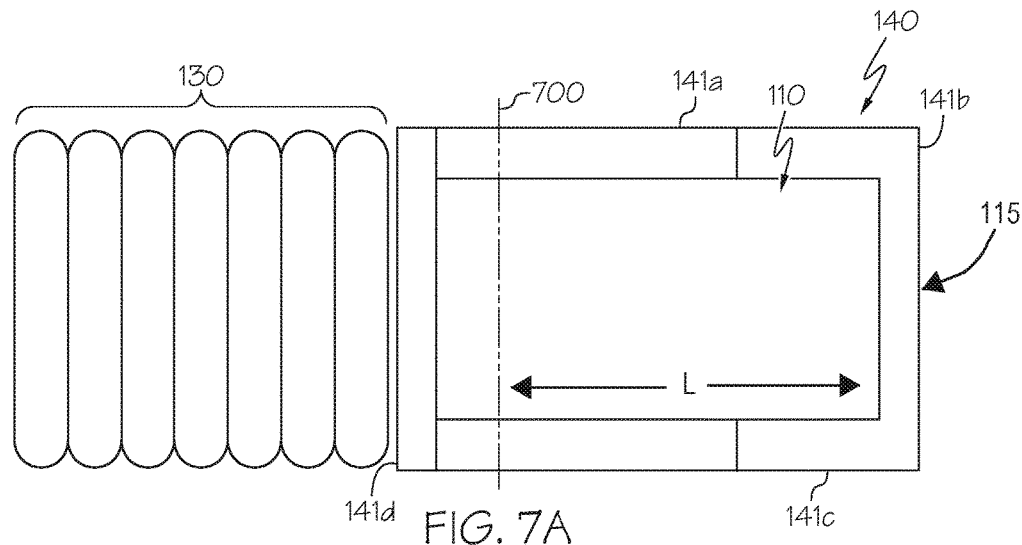
FIG. 7A schematically depicts a top view of the mattress system of the person support apparatus of FIG. 6, according to one or more embodiments shown and described herein.

Referring now to FIGS. 6 and 7A, the lower portion 140 of the mattress system 104 includes a fluidized bed of particulate material as described herein with respect to the embodiment of the person support apparatus 10 depicted in FIGS. 1 and 2. Specifically, the lower portion 140 of the mattress system 104 includes a bladder portion 110 enclosed by sidewalls 141a, 141b, 141c, 141d which generally form a tub portion 115 of the mattress system 104. The sidewalls 141a, 141b, 141c, 141d may be formed from foam (such as, for example, open and/or closed cell polyurethane foam), fluid bladders, or a composite of foam and fluid bladders. The bladder portion 110 contains particulate material, such as glass, plastic, and/or ceramic microspheres (i.e., beads). A fluidization system (not shown), such as a pump, may be used to pump a fluid, such as gas or air, into the interior volume of the bladder portion 110, thereby fluidizing the particulate material and creating a central, fluidized bed (of fluidized particulate material) 112 in the lower portion 140 of the mattress system 104. This fluidized bed 112 assists in distributing and redistributing pressure against the skin of a person positioned on the mattress system 104. It should be understood that the lower portion 140 of the mattress system 104 of the person support apparatus 10 depicted in FIG. 1 has the same general structure as the lower portion 140 of the mattress system 104 of the person support apparatus 100 depicted in FIGS. 6 and 7A.

Reference will now be made to the embodiment of the person support apparatus 10 depicted in FIGS. 1-2, the embodiment of the person support apparatus 100 depicted in FIG. 6, and the mattress system 104 depicted in FIGS. 7A-7D to describe embodiments of methods of operating the respective person support apparatuses 10, 100.

Figure 7B:
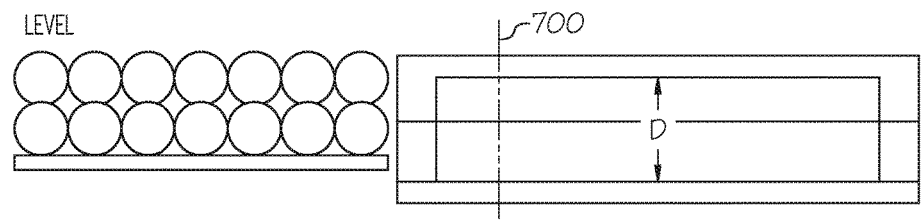
FIG. 7B schematically depicts an elevation view of the mattress system of the person support apparatus of FIG. 6 with a foot end level with a seat end, according to one or more embodiments shown and described herein.
Figure 7C:
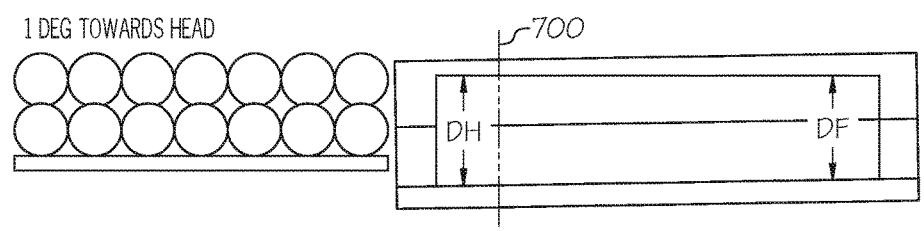
FIG. 7C schematically depicts an elevation view of the mattress system of the person support apparatus of FIG. 6 with a foot end disposed above a seat end, according to one or more embodiments shown and described herein.
Figure 7D:
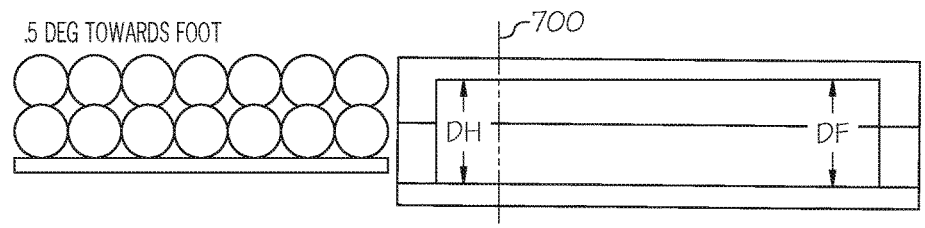
FIG. 7D schematically depicts an elevation view of the mattress system of the person support apparatus of FIG. 6 with a foot end disposed below a seat end, according to one or more embodiments shown and described herein.

Referring now to FIGS. 1-2, 6, and 7A-7D, the fluidization of the particulate material to create the fluidized bed 112 causes the particulate material within the bladder portion 110 to be mobile and readily redistributed throughout the bladder portion 110. That is, when the upper frame 102 is level with respect to horizontal (i.e., gravity), the particulate material will have a uniform depth D within the bladder portion 110, as depicted in FIG. 7B. However, when the upper frame 102 is at an angle with respect to horizontal, the particulate material will migrate to one end of the bladder portion 110 due to gravity. For example, FIG. 7C schematically depicts a cross section of the bladder portion 110 when the head end of the upper frame 102 is tilted downward by 1°. This tilt causes the particulate material to migrate within the bladder portion 110 towards the head end of the bladder portion 110, thereby increasing the depth DH of the particulate material at the head end of the bladder portion 110, and decreasing the depth DF of the particulate material at the foot end of the bladder portion 110. By way of contrast, FIG. 7D schematically depicts a cross section of the bladder portion 110 when the foot end of the upper frame is tilted downward by 0.5°. This tilt causes the particulate material to migrate within the bladder portion 110 towards the foot end of the bladder portion 110, thereby increasing the depth DF of the particulate material at the foot end of the bladder portion 110, and decreasing the depth DH of the particulate material at the head end of the bladder portion 110.

In order to prevent a person positioned on the mattress system 104 from "bottoming" in the bladder portion 110 (that is, in order to maintain an adequate volume of particulate material between the person and the support frame), it has been determined that the foot end of the upper frame 102 should be elevated with respect to the head end of the upper frame 102. This causes the depth DH of the particulate material in the head end of the bladder portion 110 to be greater than the depth DF of the particulate material in the foot end of the bladder portion 110 and also decreases or mitigates the migration of particulate material from the head to the foot end. More specifically, it has been determined that a person will generally be positioned on the mattress system 104 such that their sacrum (i.e., lower back/gluteus muscles) is positioned on the bladder portion proximate the head end of the bladder portion 110, as indicated by line 700, which corresponds to a maximum immersion depth location of the person. As such, the greatest percentage of the person's weight is incident on the bladder portion 110 along this line, potentially causing the displacement of beads towards the foot end of the bladder portion 110 and potentially leading to the person bottoming in the fluidized bed 112. However, if the foot end of the bladder portion 110 is raised with respect to the head end of the bladder portion 110, the depth of beads is greater along the line 700, decreasing the potential for bottoming out in the fluidized bed 112. In the embodiments described herein, with respect to the reference position, the foot end of the upper frame 102 is inclined at an angle greater than 0° and less than 1°, such as less than or equal to 0.75°, less than or equal to 0.5°, or even less than or equal to 0.25°, in order to achieve and maintain an appropriate distribution of particulate material in the bladder portion 110. The reference position may be in a range from about +0.1° to about −0.5° such that the person support apparatus 10, 100 is oriented with the foot end 120 of the person support apparatus 10, 100 when the reference position is in a negative end of the range, such as at −0.5°. In embodiments described herein, with respect to the reference position, the foot end of the upper frame 102 is disposed higher than the head end and is inclined at an angle that is in a range of from about 0° to about 10.1°.

In addition, when moving the upper frame 102 either up or down relative to the base frame 101 changes in the relative inclination/declination of the head end 122 and the foot end 120 of the upper frame 102 can result in a significant and often undesirable redistribution of the particulate material within the bladder portion. More specifically, it has been found that the angular orientation of the upper frame should be maintained within (i.e., in a range from about) +/−0.5°, such as +/−0.4°, +/−0.3°, +/−0.25° (i.e., within an orientation reference range), relative to or of a predetermined, nominal reference orientation (i.e., the reference position), such as an orientation where the foot end 120 of the upper frame 102 is elevated above the head end 122 of the upper frame 102, to avoid significant redistribution of the particulate material in the bladder portion 110. Embodiments of the methods and control systems described herein allow the relative orientation of the upper frame 102 to be maintained within a range of +/−0.5° of a predetermined, nominal reference orientation as the upper frame 102 is raised and/or lowered relative to the base frame 101.

Still referring to FIGS. 1-2 and 6, in embodiments, the person support apparatus 10, 100 is maintained within a range of +/−0.5° of the predetermined, nominal reference orientation as the upper frame 102 is raised and/or lowered relative to the base frame 101 using a proportional-integral-derivative (PID) algorithm. This method utilizes an angle derived from a potentiometer operatively associated with one of the actuators (i.e., the foot actuator 111 or the head actuator 113) as an input during hi-lo motion and adjusts the speed of one of the actuators relative to the other to maintain the angle of orientation of the upper frame 102 at the nominal reference orientation. The angular orientation of the upper frame as determined/derived from the potentiometer operatively associated with one of the actuators is more stable and, hence, more accurate than the angular orientation derived from an inclinometer device. However, the inclinometer device may be used to determine an angle of the floor relative to horizontal and, thereafter, this value may be used to correct any errors in the potentiometer-based angle prior to the start of movement of the upper frame 102.

In embodiments, the actuators have an initial soft start during which the actuator that is driven at a greater speed to correct for any starting error starts 200 ms before the other actuator. If the difference in the angle between the head and foot ends of the upper support frame is zero, one actuator is still started after the other using the 200 ms delay. During this delay, the actuator in motion is incremented at a 10% duty cycle speed. After the delay has expired, the actuator requiring higher speed is incremented at a 10% duty cycle and the slower actuator increments at a 5% duty cycle. In embodiments, the first actuator is incremented at a first duty cycle speed that is at least double a second duty cycle speed at which the second actuator is incremented, and the first duty cycle speed may be at a 10% pulse-width-modulation and the second duty cycle speed at 5% pulse-width-modulation.

In embodiments, after the actuators are started using the aforementioned "soft start", the PID algorithm is implemented using the potentiometer derived angle, after correcting for any inclinometer angular value read prior to the starting drive motion. Moving the upper frame in this manner maintains the bed at the nominal reference orientation thus preventing excessive migration of the support beads from under the person. In addition, using a potentiometer-based angle during movement of the upper frame 102 avoids response delays due to filtering of signals from an inclinometer.

Referring now to FIGS. 1-2 and 6-8, in embodiments, the control box 24 of the person support apparatus 10, 100 is communicatively coupled to the first and second potentiometers P1 and P2 operatively associated with the head and foot actuators, and the inclinometer I. As noted hereinabove, the first potentiometer P1 may be operatively associated with the head actuator 113 at a head end 122 (e.g., a first or second end) of the person support apparatus 10, 100 and may output a first reading indicative of an angular orientation of the head end 122 of the upper frame 102 relative to the base frame 101. For example, angles stored in a lookup table of a storage database of the control box 24 may be indexed as a function of the potential measured by the potentiometer, as described herein. The second potentiometer P2 may be operatively associated with the foot actuator 111 at a foot end 120 (e.g., a second or first end) of the person support apparatus 10, 100 and may output a second reading indicative of an angular orientation of the foot end 120 of the upper frame 102 relative to the base frame 101. For example, angles stored in a lookup table of a storage database of the control box may be indexed as a function of the signal output by the potentiometer, as described herein. The inclinometer I may output a floor angle reading of the person support apparatus 10, 100 relative to horizontal level. As described herein, the control box 24 may include a graphical user interface (GUI) to assist with adjusting the angular orientation of the upper frame 102 of the person support apparatus 10, 100 and moving the upper frame 102 of the person support apparatus 10, 100 in upwards and downwards directions (indicated by arrow 600). The caregiver may be able to adjust angular orientations of the upper frame 102 of the person support apparatus 10, 100 and move the upper frame 102 in upwards and downwards directions (indicated by arrow 600) via a soft key or button provided on the GUI of control box 24.

In embodiments, and referring to FIG. 8, the actuators 111, 113, associated potentiometers P1, P2 and/or inclinometer I are communicatively coupled to the control box 24 and the various components of upper frame 102 work in conjunction with one another to control angular orientations of the upper frame 102 of the person support apparatus 10, 100, as described in more detail below.

Figure 8:
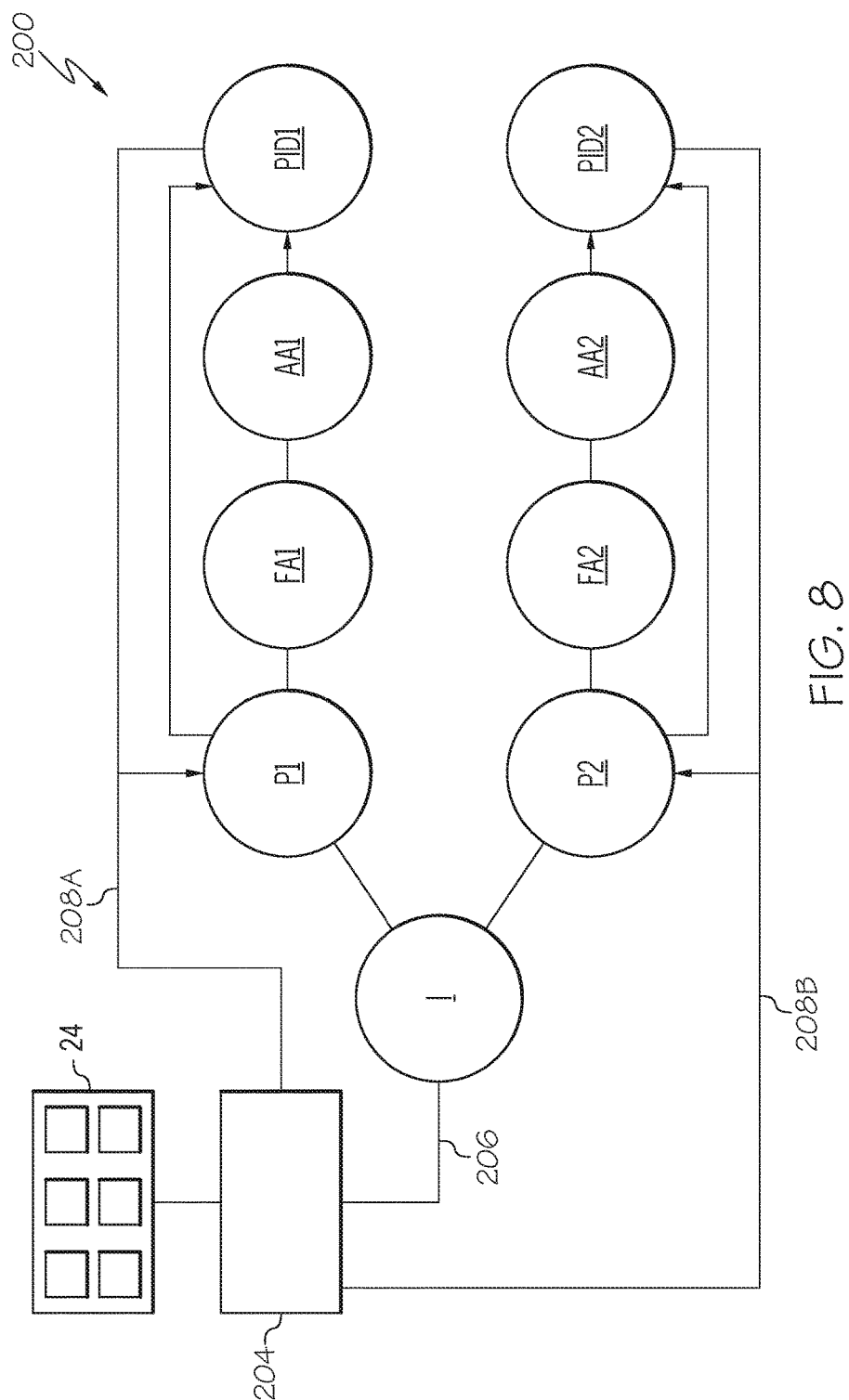
FIG. 8 schematically depicts a system for implementing a method to control angular orientations of two portions of a person support apparatus, according to one or more embodiments described herein.

As shown in FIG. 8, in some embodiments the person support apparatus 10, 100 includes a system 200 for controlling an angular orientation of the upper frame 102 of the person support apparatus 10, 100. The system 200 includes the control box 24, the inclinometer I, the potentiometers P1 and P2, and the actuators 111, 113. The system 200 further includes first and second PID controllers, PID1 and PID2, and a microcontroller 204 to which the system components are communicatively coupled via communication paths 206 and 208A-208B, as described further below, either by wires or wirelessly. The microcontroller 204, such as an electronic control unit, has a processor and a non-transitory storage medium, such as a memory, containing readable and executable instructions which, when executed by the processor, cause the processor to enact steps. Such steps, for example, may result in instructing the electronic control unit to adjust at least one of the height and angular orientation of the upper frame 102 of the person support apparatus 10, 100 such that the fluidized particulate material has a predetermined distribution in the bladder portion 110 during such movements and upon discontinuing such movements. The microcontroller 204 is also communicatively coupled to the GUI of the control box 24. The microcontroller 204 and the GUI are able to exchange electrical signals therebetween to facilitate operation of actuators 111, 113 to control the angular orientation of the upper frame 102 of the person support apparatus 10, 100 with respect to the base frame 101 and to facilitate upwards and downwards (i.e., high and low or "hilo" or "hi-lo") movement of the upper frame 102 of the person support apparatus 10, 100.

In embodiments, the system 200 receives an input from a GUI of control box 24 to instruct the microcontroller 204 of a desired upwards or downwards movement of the upper frame 102 of the person support apparatus 10, 100 (e.g., when an operator desires to raise or lower the height of the person support apparatus 10, 100 and, in particular, the upper frame 102 of the person support apparatus 10, 100). The system 200 operates to ensure the bladder portion 110 is in an orientation such that the fluidized particulate material within the bladder portion 110 has a predetermined distribution and will remain so with any upwards or downwards movement of the upper frame 102 of the person support apparatus 10, 100. For example, and as discussed above, the predetermined distribution of the particulate material may be such that the foot end of the bladder portion 110 is slightly elevated with respect to the head end of the bladder portion 110 such that a depth of the fluidized particulate material at the head end is greater than at the foot end, particularly at the point of maximum immersion. Along communication path 206, the microcontroller 204 receives a reading from the inclinometer I indicative of a floor angle of the person support apparatus 10, 100 relative to horizontal. And along communication paths 208A and 208B, the microcontroller 204 receives first and second readings from potentiometers P1 and P2 associated with actuators 113, 111, for example, that are indicative of respective angular orientations of respective head and foot ends 122 and 120 of the upper frame 102 of the person support apparatus 10, 100. For example, a stroke length of the actuator 111, 113 dictates the angular orientation of the upper frame 102 of the person support apparatus 10, 100 with respect to horizontal. The amount of the stroke length is associated with the amount of angular rotation of the upper frame 102 of the person support apparatus 10, 100 about an axis parallel to the y axis of FIG. 6. The angular orientation of the upper frame 102 of the person support apparatus 10, 100 may also be adjusted to be maintained within an acceptable reference range with respect to the base frame 101 of the person support apparatus 10, 100.

Figure 9:
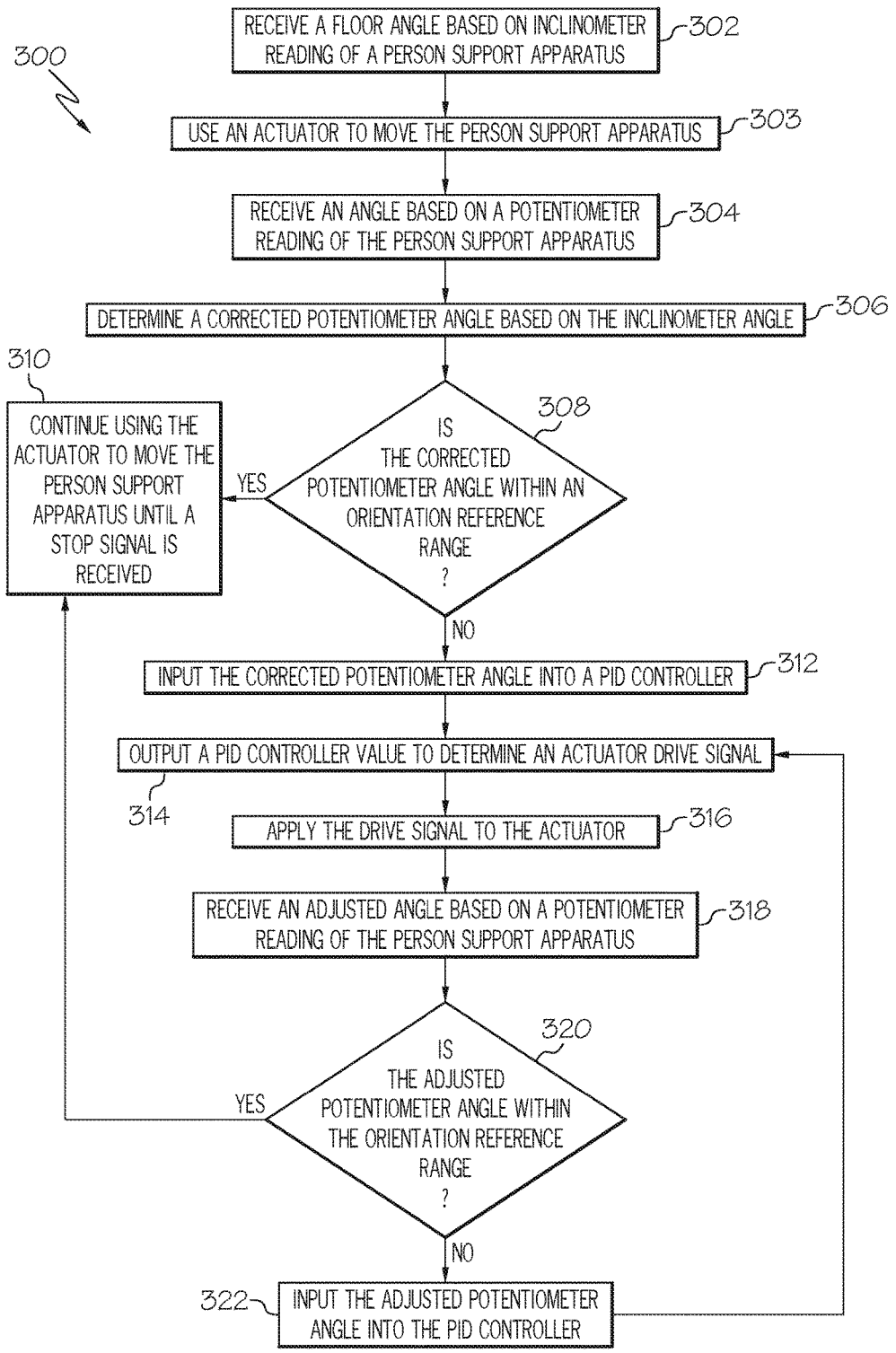
FIG. 9 schematically depicts a flow chart of a method to control angular orientations of a portion of a person support apparatus, according to one or more embodiments described herein.

The readings from the potentiometers P1 and P2 are indicative of internal reference angles of the upper frame 102 relative to the base frame 101. As such, the readings from potentiometers P1 and P2 may be corrected to account for non-horizontal floor angles FA1, FA2 relative to horizontal as determined by the inclinometer I. In embodiments, the floor angle may be a single floor angle read from a single inclinometer, for example. The readings from potentiometers P1 and P2 are calibrated and corrected to account for floor angle by adjusting the internal reference angles based on the actual floor angles to obtain corrected potentiometer readings AA1, AA2, as described further below in greater detail with respect to FIG. 9. These corrected potentiometer readings AA1, AA2 are respectively input into first and second PID controllers PID1, PID2. The outputs of first and second PID controllers PID1, PID2 are used to adjust the operation of the actuators, such as a speed of operation and/or stroke length of the actuators, so that the upper frame 102 has a specified orientation with respect to the base frame 101 and the fluidized particulate material has a predetermined distribution within the bladder portion 110. In embodiments, the outputs of first and second PID controllers PID1, PID2 may be sent through a control feedback loop to continue adjusting input potentiometer readings P1 and P2 until the outputs of first and second PID controllers PID1, PID2 are within a nominal reference orientation, within which the fluidized particulate material contained the bladder portion 110 of the person support apparatus 10, 100 has a predetermined distribution.

In embodiments, a method for controlling an angular orientation of a person support apparatus 10, 100 including a support surface (e.g., the mattress system 104) having a bladder portion 110 containing fluidized particulate material (e.g., the fluidized bed 112 of particulate material), an upper frame 102, and a base frame 101 may include adjusting a height of the upper frame 102 with respect to the base frame 101 with at least one of a first actuator and a second actuator at respective first and second actuator speeds. In the embodiments described herein, the first actuator may be one of actuators 111, 113 and the second actuator may be the other of actuators 111, 113. The method may include determining a dynamic angular orientation of the upper frame 102 with respect to the base frame 101 based on at least one of an operating characteristic of the first actuator and an operating characteristic of the second actuator, and determining a corrected angular orientation based on the dynamic angular orientation and a floor angle indicative of the orientation of the base frame with respect to horizontal (the operating characteristic may be, for example, a stroke length of the respective actuator). The method may further include comparing the corrected angular orientation with an orientation reference range, and adjusting at least one of the first actuator speed and the second actuator speed when the corrected angular orientation is outside the orientation reference range until the corrected angular orientation is within the orientation reference range. In embodiments, the method may further include an initial step of determining the floor angle indicative of the orientation of the base frame with respect to horizontal based on a value generated from an inclinometer I disposed on the person support apparatus 10, 100. In embodiments, at least one of the first actuator speed and the second actuator speed are adjusted and the dynamic angular orientation is determined as the upper frame 102 transitions with respect to the base frame 101 from a first height to a second height. The dynamic angular orientation is determined at least partially based on one or more values generated from at least one of a first potentiometer associated with the first actuator and a second potentiometer associated with the second actuator. In the embodiments described herein, the first potentiometer may be one of potentiometers P1, P2 and the second potentiometer may be the other of potentiometers P1, P2. The orientation reference range may be measured relative to a reference position of the person support apparatus, which may be at 0.25° such that the person support apparatus is oriented with a foot end of the person support apparatus higher than a head end. The reference position may be in a range from about +0.1° to about −0.5° such that the person support apparatus is oriented with a foot end of the person support apparatus higher than a head end when the reference position is in a negative end of the range. The orientation reference range may in one of the following ranges relative to the reference position: a range from about −0.4° to about +0.4° relative to the reference position, and a range from about −0.25° to about +0.25° relative to the reference position.

In embodiments, a method for controlling an angular orientation of a person support apparatus 10, 100 that includes a support surface (e.g., the mattress system 104) having a bladder portion 110 containing fluidized particulate material (e.g., the fluidized bed 112 of particulate material) may include actuating at least one of a first actuator and a second actuator, respectively coupled to the person support apparatus at a first end and a second end, at a respective first actuator speed and a second actuator speed to raise or lower a height of the person support apparatus 10, 100. In the embodiments described herein, the first end may be one of the ends 120, 122 and the second end may be the other of the ends 120, 122. The method may further include receiving a first reading indicative of a first angular orientation of the first end of the person support apparatus 10, 100 with respect to the second end and relative to horizontal. The first reading may be at least generated from a first sensor and a second sensor respectively associated with the first actuator and the second actuator. The first sensor and/or the second sensor may be any of the sensors as described herein such as a potentiometer and/or inclinometer or another suitable sensor. The method may further include determining a corrected first reading indicative of the first angular orientation based on the first reading and a calibration of the person support apparatus 10, 100, comparing the corrected first reading and an orientation reference range, and actuating at least one of the first actuator and the second actuator automatically at a different speed when the corrected first reading is outside the orientation reference range until an adjusted corrected first reading indicative of an adjusted first angular orientation is within the orientation reference range. In embodiments, the method may further include comprising calibrating the person support apparatus 10, 100 to generate the calibration, which includes calculating, automatically with an inclinometer I, a floor angle associated with the person support apparatus 10, 100 relative to horizontal.

In embodiments, the first reading may be generated from at least one of a first potentiometer associated with the first actuator and a second potentiometer associated with the second actuator, and determining the corrected first reading may include calculating the corrected first reading based on the first reading and the floor angle. Further, the method may include receiving input from at least one of the first potentiometer and the second potentiometer respectively in at least one of a first PID controller and a second PID controller, outputting at least one of a first actuator drive signal from the first PID controller and a second actuator drive signal from the second PID controller, and repeating the receiving and outputting steps until the adjusted corrected first reading indicative of the adjusted first angular orientation is within the orientation reference range.

In embodiments, the first reading may be at least partially generated from a first potentiometer associated with the first actuator and a second potentiometer associated with the second actuator, and actuating at least one of the first actuator and the second actuator comprises outputting a stroke length signal related to a stroke length for the respective first and second actuators, wherein the stroke length of the first actuator is an input with respect to the first potentiometer and the stroke length of the second actuator is an input with respect to the second potentiometer. The method may further include receiving the respective stroke lengths for the first and second actuators associated with the corrected first reading as a respective input in at least one of a first PID controller and a second PID controller, outputting at least one of a first actuator drive signal from the first PID controller and a second actuator drive signal from the second PID controller, and repeating the receiving and outputting steps until the adjusted corrected first reading indicative of the adjusted first angular orientation is within the orientation reference range.

In embodiments, a system (e.g., system 200) for controlling an angular orientation of a person support apparatus 10, 100 may include at least a first actuator associated with a head end as a first end and a second actuator associated with a foot end as a second end of the person support apparatus, and an electronic control unit comprising a processor communicatively coupled to a non-transitory computer storage medium. The non-transitory computer storage medium stores instructions that may, when executed by the processor, cause the processor to perform the steps set forth above and/or any steps as set forth herein.

Referring to FIGS. 1-9, for example, an exemplary method 300 of using the system 200 is described for controlling the angular orientation of the person support apparatus 10, 100 to maintain the fluidized particulate material contained within the bladder portion 110 of the person support apparatus 10, 100 in a predetermined distribution within the bladder portion 110 when at least one of an angular orientation of an end 120, 122 of the upper frame 102 of the person support apparatus 10, 100 is adjusted or the person support apparatus is adjusted in an upwards or downwards direction (i.e., when adjusting a height of the upper frame 102 with respect to the base frame 101 with at least one of a first actuator and a second actuator, which may respectively be either of actuators 111, 113 at respective first and second actuator speeds). Thus, in embodiments, actuating at least one of actuators 111, 113, which are respectively coupled to the person support apparatus at the foot end 120 and the head end 122 of the person support apparatus 10, 100, at respective speeds raises or lowers a height of the person support apparatus 10, 100.

In embodiments, the method 300 may include an initial step of determining the floor angle indicative of the orientation of the base frame 101 with respect to horizontal based on a value generated from an inclinometer I disposed on the person support apparatus 10, 100. In step 302, for example, a reference angle is received based on an inclinometer reading from an inclinometer I of the person support apparatus 10, 100, which reading is indicative of a floor angle of the person support apparatus 10, 100 relative to horizontal such that the floor angle is determined. In step 304, a reading from a first and/or second potentiometer P1, P2 is received automatically by the electronic control unit, which reading (i.e., a first reading) is indicative of an angle (i.e., a first angular orientation of a first end with respect to a second end, which may be either of ends 120, 122, and relative to horizontal) or dynamic angular orientation of the upper frame 102 with respect to the base frame 101 of the person support apparatus 10, 100. The readings generated from first and/or second potentiometers P1, P2 as first and/or second sensors (each associated with first and/or second actuators that may be either of actuators 111, 113) may be based on respective internal reference angles (i.e., values generated from the first and/or second potentiometers P1, P2) that do not account for floor angle, for example. To account for such floor angle (i.e., to determine a corrected first reading), the readings are calibrated using the reading from the inclinometer I to account for floor angle (i.e., the corrected first reading is based on the first reading from the potentiometers P1 and/or P2 and a calibration of the person support apparatus 10, 100 to determine floor angle). For example, in embodiments, the method 300 includes calibrating the person support apparatus 10, 100 to generate the calibration, which includes calculating (automatically with the inclinometer I) a floor angle associated with the person support apparatus relative to horizontal. Thus, determining the corrected first reading may include calculating the first reading (i.e., generated from potentiometers P1 and/or P2) and the floor angle (i.e., generated from the inclinometer I).

For example, in step 306, a corrected potentiometer reading or angle, or corrected first and second readings, is determined (i.e., as a corrected angular orientation) automatically with the electronic control unit based on the respective first and second readings from step 304 (i.e., that determine the dynamic angular orientation) and a calibration of the person support apparatus 10, 100 (i.e., that is based on a determined floor angle). The corrected first and second readings determined by the electronic control unit may be based on readings from instruments such as the potentiometers and other similar electronic instruments, which are within the scope of this disclosure. The calibration may include, for example, calculating automatically with the inclinometer I a floor angle associated with the person support apparatus 10, 100 relative to horizontal, and calculating automatically with the electronic control unit the corrected first and second readings based on respective received first and second readings from the potentiometers and the floor angle. For example, referring again to FIG. 8, the readings from potentiometers P1 and P2 are calibrated and corrected to account for floor angle by adjusting the internal reference angles based on the actual floor angles to obtain corrected potentiometer readings AA1, AA2. To do this, offset floor angles FA1, FA2 are calculated, which is a respective difference between inclinometer I and readings from potentiometers P1, P2. Then, a sum of the readings from potentiometers P1, P2 and the offset floor angles FA1, FA2 provide corrected potentiometer readings AA1, AA2, which reflect a reading from inclinometer I. In embodiments, input from the potentiometers P1 and/or P2 (indicative of respective stroke lengths of associated actuators 111, 113) may be received in the first and/or second PID controllers PID1, PID2, and the controllers may each output an actuator drive signal for each of actuators 111, 113 (i.e., as first and/or second actuator drive signals), and may repeat these steps until an adjusted corrected first reading indicative of the adjusted first angular orientation is within the orientation reference range as described herein. Further, actuating the actuators 111 and/or 113 may include outputting a stroke length signal related to a respective actuator stroke length. A stroke length of each actuator 111, 113 (either which may be first and second actuators) is an input to associated first and second potentiometers (i.e., either of potentiometers P1, P2).

Referring again to FIGS. 1-9 and step 308, in embodiments, the electronic control unit may automatically compare corrected first and/or second readings (i.e., the corrected angular orientation) with an orientation reference range. When the first and/or second readings are within the orientation reference range (such as a coarse orientation reference range), the fluidized particulate material contained within the bladder portion 110 of the person support apparatus 10, 100 has a desired distribution within the bladder portion 110. In embodiments, if the corrected potentiometer angle is within the coarse orientation reference range in step 308, the method 300 continues to step 310 to continue using the respective first and/or second actuators 113, 111 to move the upper frame 102 of the person support apparatus 10, 100 in an upwards or downwards direction (indicated by arrow 600) until a stop signal is received by the electronic control unit. The orientation reference range may be, for example, the nominal reference orientation plus or minus (+/−) an angular tolerance as described above. The orientation reference range may be, for example, within a range of from about −0.4° relative to the nominal reference orientation to about +0.4° relative to the nominal reference orientation, or within a range of from about −0.25° relative to the nominal reference orientation to about +0.25° relative to the nominal reference orientation. In embodiments, the orientation reference range may be, for example, a coarse orientation reference range that is within a range of from about −0.4° relative to the nominal reference orientation to about +0.4° relative to the nominal reference orientation. A fine orientation reference range may be within the coarse orientation reference range and a breadth of the fine orientation reference range may be less than a breadth of the coarse orientation reference range. The fine orientation reference range may be, for example, within a range of from about −0.25° relative to the nominal reference orientation to about +0.25° relative to the nominal reference orientation. It is contemplated that a single orientation reference range, rather than a coarse and a fine orientation reference range, may be utilized to determine whether a corrected first reading is within or outside of the orientation reference range. Thus, wherever "coarse" or "fine" is described herein, a single orientation reference range may be contemplated as well.

If the corrected potentiometer angle is outside the coarse orientation reference range in step 308, the method 300 continues on to step 312 to input the corrected potentiometer angle into a PID controller. In embodiments, when the corrected first and/or second readings (i.e., the corrected angular orientation) are outside the orientation reference range (e.g., outside the coarse orientation reference range), the electronic control unit automatically adjusts the corrected first and/or second readings (i.e., through actuating respectively associated first and/or second actuator speeds of actuators 111, 113 at a different speed) to obtain respective adjusted first and/or second readings (i.e., an adjusted corrected first reading) indicative of respective adjusted first and/or second angular orientations of respective first and/or second ends 122, 120 of the person support apparatus 10, 100 (i.e., indicative of an adjusted first angular orientation or corrected angular orientation) until the corrected angular orientation is within the orientation reference range. In embodiments, in step 312, the corrected potentiometer reading or angle (that may be at least one of the first and/or second readings described herein that generate, for example, the corrected angular orientation) is input into an associated PID controller PID1, PID2. For example, the corrected potentiometer readings AA1, AA2 are input into respective PID controllers PID1, PID2. In embodiments, to obtain adjusted first and/or second readings, in step 314, a PID controller value is output to determine a respective actuator drive signal that, in step 316, is applied to drive a respective foot and/or head actuator 111, 113 (e.g., either of which may be a first actuator or a second actuator). In embodiments, the actuator drive signals applied to drive the respective actuators 111, 113 may relate to a stroke length of the actuator and/or a speed of actuation of the actuator (i.e., an operating characteristic of the actuators 111, 113). In embodiments, the foot actuator 111 and/or the head actuator 113 have respective speeds that are adjusted as the upper frame 102 transitions with respect to the base frame 101 from a first height to a second height during which time the dynamic angular orientation is determined. For example, in the case of linear actuators, increasing or decreasing a stroke length of the actuator adjusts the angular orientation (i.e., the dynamic angular orientation) of the upper frame 102 with respect to the base frame 101, driving upper frame 102 towards a position within an orientation reference range. Similarly, increasing or decreasing a speed of the actuator adjusts the angular orientation of the upper frame 102 with respect to the base frame 101, driving upper frame 102 towards a position within an orientation reference range.

In step 318, the electronic control unit receives adjusted first and/or second angular orientations with respective first and second actuators operatively coupled to respective first and second ends 122, 120 of the person support apparatus 10, 100 to obtain adjusted first and/or second readings indicative of the adjusted first and/or second angular orientations. In embodiments, the first and/or second angular orientations may be calibrated and corrected based on the inclinometer angle received in step 302. In alternative embodiments, the PID controller value is output to determine the adjusted first and/or second readings, such as in a situation where the readings are adjusted in a background simulation tool to obtain simulated adjusted first and/or second readings within the fine orientation reference range prior to an actual actuation of respective foot and/or head actuators 111 and 113 based on the obtained simulated adjusted first and/or second readings that are within the fine orientation reference range.

In step 320, in some embodiments, the electronic control unit compares the adjusted first and/or second readings with the fine orientation range. When the adjusted first and/or second readings are outside of the respective fine orientation reference range, the method 300 proceeds to step 322 to repeat steps 314 to 320 until the adjusted first and/or second readings are within the respective fine orientation reference range. When in step 320 it is determined that the adjusted first and/or second readings are within the respective fine orientation reference range, the method 310 proceeds to step 310 to continue using the foot and/or head actuators 111, 113 to move the upper frame 102 of the person support apparatus 10, 100 in an upwards or downwards direction (indicated by arrow 600) until a desired position is achieved (e.g., when a user ceases hilo movement of the person support apparatus).

In embodiments, the output PID controller value is looped via a looping algorithm, for example, to act as input values of simulated or actual potentiometer angular readings into a PID controller loop to adjust the PID controller value output until it is within (and to maintain it within) a predetermined error range. While the present disclosure describes a methodology adjusting the PID controller value output until it is within (and to maintain it within) a predetermined error range, for example, it should be understood that the PID controller value output may be adjusted to minimize a difference or error between measured output values and a predetermined error-basis value reflecting a predetermined angular orientation that would allow for distribution of the fluidized particulate material within the bladder portion 110, and which predetermined error-basis value would be within the predetermined error range.

The present disclosure describes a methodology of incorporating, for example, a control feedback loop to assist with movement of a person support apparatus 10, 100 such that the fluidized particulate material remains at a predetermined distribution within the bladder portion 110 during such movement, for example. In embodiments, physical use of the actuators to correct the angular orientations of the person support apparatus 10, 100 to be within the orientation reference range as described herein may occur when the person support apparatus 10, 100 happens to be at a level or position where the fluidized particulate material in the bladder portion 110 is not at a predetermined distribution within the bladder portion 110 and is to be adjusted to achieve the predetermined distribution, which may occur prior to or during the person support apparatus 10, 100 being moved in an upwards or downwards direction (indicated by arrow 600) in a hilo movement.

In embodiments, a caregiver may adjust the person support apparatus 10, 100 by use of a GUI on the control box 24, as described herein, where the caregiver is only permitted to make such adjustments that are within a restricted, preset range as found and controlled by the PID controller outputs of PID controllers PID1 and/or PID2. Thus, movement of the person support apparatus may be limited such that when the caregiver provides an instruction via the GUI, the adjustment only occurs after a looping algorithm has determined stroke lengths for one or both actuators 111, 113 that place the adjustment within an orientation reference range. In embodiments, adjusting the first and/or second angular orientations may include using at least one of operation of a semi-manual control and an automatic control. In embodiments, the operation may include, for example, controlling one of an upwards and downwards movement of the person support apparatus 10, 100 with at least one of the foot and/or head actuators 111, 113. Adjusting at least one of the first and second angular orientations may include the electronic control unit outputting a stroke length signal that determines a stroke length for a respective foot and/or head actuators 111, 113. The at least one of the first and second angular orientations of the respective foot and head ends 120, 122 of the person support apparatus 10, 100 may be adjusted by an amount proportional to the stroke length. Alternatively, the operation may include, for example, a caregiver inputting a first value on the GUI, and, when the first value is within the orientation reference range or the fine orientation reference range, the electronic control unit outputs a stroke length signal based on the first value and for a first stroke length associated with the first motor M1. The angular orientation of the head end 122 of the person support apparatus 10, 100 is adjusted by an amount proportional to the first stroke length. In embodiments, the operation may further include inputting a second value on the GUI, and, when the second value is within the orientation reference range or the fine orientation reference range, the electronic control unit outputs a stroke length signal based on the second value and for a second stroke length associated with the second motor M2. The angular orientation of the foot end 120 of the person support apparatus 10, 100 is adjusted by an amount proportional to the first stroke length.

In some embodiments, a caregiver may input adjustments to control one or both of motors M1, M2 to actuate angular orientation movements of respective portions of the person support apparatus 10, 100 that remain within the coarse or fine orientation reference range and maintain a predetermined distribution of the fluidized particulate material within the bladder portion 110. Thus, the caregiver would not be able to input adjustments that would lead to a distribution of the fluidized particulate material outside of the predetermined distribution or which would lead to a bottoming out of the fluidized particulate material within the bladder portion 110. For example, only motor M1 may be adjusted to adjust the angular orientation of a first portion of the person support apparatus 10, 100 with respect to a stationary second portion of the person support apparatus to maintain or cause a predetermined distribution of the fluidized particulate material layer within the bladder portion 110 during hilo movement of the person support apparatus 10, 100. Or only motor M2 may be adjusted to adjust the angular orientation of a second portion of the person support apparatus 10, 100 with respect to a stationary first portion of the person support apparatus to maintain or cause a predetermined distribution of the fluidized particulate material layer within the bladder portion 110 during hilo movement (indicated by arrow 600) of the person support apparatus 10, 100. The first end may be one of the head end 122 or the foot end 120 of the person support apparatus 100, and the second end may be the other of the head end 122 or the foot end 120 of the person support apparatus 100. It is contemplated within this disclosure that multiple actuators at varying positions, portions, or ends of the person support apparatus 10, 100 may be used with the looping algorithm of this disclosure to maintain the fluidized particulate material as a distributed layer within the bladder portion 110.

In embodiments, a difference between the adjusted first and second readings may be within a range of from about +0.1° to about −0.5°. In embodiments, a difference between the adjusted first and second readings may be within a range of from about +0.65° to about −0.15°. In embodiments, a difference between the adjusted first and second readings may be within a range of from about +0.75° to about −0.75°. When the difference between the adjusted first and second readings is negative, and the first portion is a head end and the second portion is a foot end of the person support apparatus 10, 100, the head end is disposed below the foot end in a trendelenburg position or direction of the person support apparatus 10, 100. When the difference between the adjusted first and second readings is positive, and the first portion is a head end and the second portion is a foot end of the person support apparatus 10, 100, the head end is disposed above the foot end in a reverse trendelenburg position or direction of the person support apparatus 10, 100.

In embodiments, when the head actuator 113 starts, it is incremented at a first duty cycle speed that may be, for example, a 10% pulse-width-modulation duty cycle speed. In embodiments, when the head actuator 113 starts and the foot actuator 111 starts, the head actuator 113 may be incremented at a first duty cycle speed that may be at least double a second duty cycle speed at which the foot actuator 111 is incremented. For example, the head actuator 113 may be incremented at a 10% pulse-width-modulation duty cycle speed, and the foot actuator 111 may be incremented at a 5% pulse-width-modulation duty cycle speed. In embodiments, drives such as actuators 111, 113 may start initially at a greater speed than they are later incremented by to correct for starting error, and one actuator, such as the head actuator 113 may start 200 ms before the other actuator, such as the foot actuator 111. If a difference between first and/or second readings of respective potentiometers P1, P2 is zero within the resolution of the angular values or orientations, actuators 111, 113 may start at different times, or only one of actuators 111 and 113 may start. Alternatively, actuators 111, 113 may start at the same time. In embodiments, the method 300 may be employed from steps 302 to 306 to conduct a calibration based on an inclinometer I reading. And, after the actuators 111 and/or 113 start, the method 300 continues on to employ steps 308 to 314 such that a PID algorithm uses potentiometer readings during a hilo movement of the person support apparatus 10, 100, for example, to avoid a response delay that may otherwise occur due to a calibration step that was not undertaken before the actuators 111 and/or 113 started.

As noted herein, the depth of the fluidized particulate material in the mattress system may vary depending on the angular orientation of the upper frame 102 of the person support apparatus 10, 100. It has also been found that the depth of the particulate material may vary depending on the angular orientation of the torso frame 109 with respect to the base frame 101, increasing the risk of bottoming out. For example, for a person of a given weight positioned on the person support apparatus 10, 100, increasing the angle of inclination of the torso frame 109 causes a greater displacement of the particulate material from beneath the person. It has now been determined that the angular orientation of the upper frame 102 can be adjusted based on the angular orientation of the torso frame 109 and the weight of the person disposed on the person support apparatus 10, 100 to ensure that sufficient particulate material is disposed beneath the person, thereby mitigating the risk of bottoming out.

Figure 10:
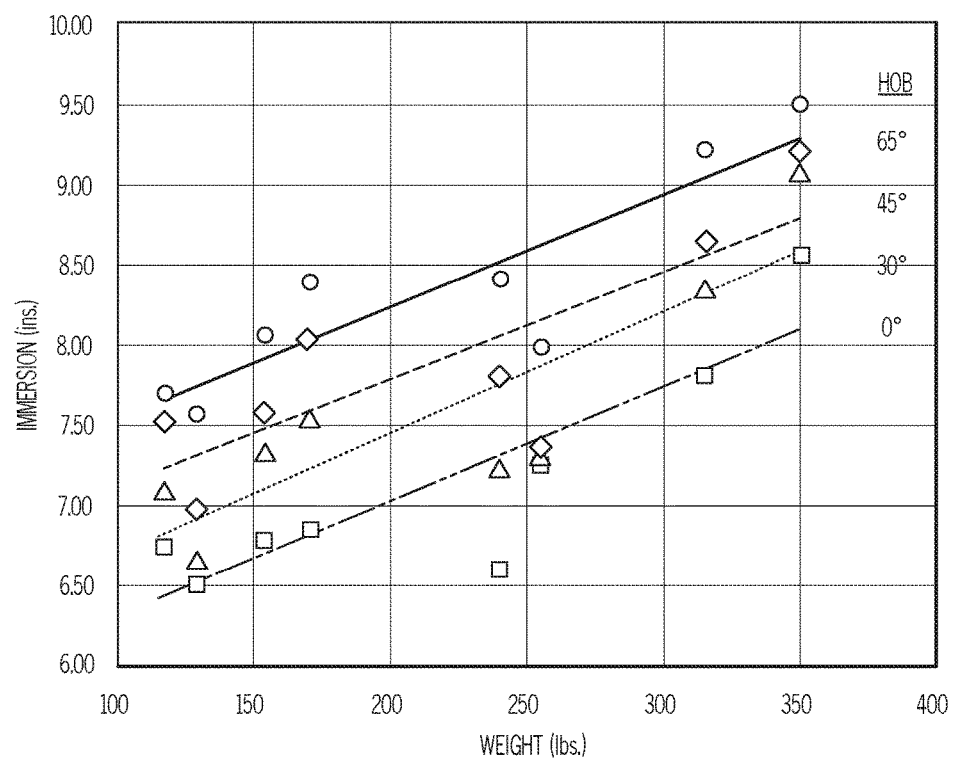
FIG. 10 is a graphical depiction of the immersion depth (y-axis) as a function of person weight showing a relationship between head of bed ("HOB") angle, person weight, and depth of immersion with respect to a fluidized particulate material disposed in a bladder portion of the support surface.

Referring now to FIGS. 7A, 10-14 and Tables 1-2 of FIGS. 15-16, example data is presented from a trial study that included six text subjects having weights varying from 117 to 350 lbs. The depth of immersion of each subject in the fluidized bed 112 was measured at the line 700 (FIG. 7A) for different head-of-bed (HOB) angles. The HOB angle corresponds to the angular orientation of the torso frame 109 (FIGS. 1 and 6) relative to the upper frame 102. The line 700 generally corresponds to the position of each subject's sacrum (i.e., the subject's lower back/gluteus muscles) on the mattress system and, hence, the point of maximum immersion in the fluidized bed. A length L is illustrated in FIG. 7A and extends from line 700 to the foot end of the fluidized bed (as measured from the interior of the tub portion) and indicates the point of maximum immersion. Depth of immersion measurements were conducted for each subject at different HOB angles for a total of 10 trials at HOB angles of 0°, 30°, 45°, and 60° to determine a maximum immersion of each subject's sacrum within the fluidized particulate material. Referring to FIG. 10, FIG. 10 graphically depicts the immersion depth (y-axis, in inches) as a function of weight (x-axis, in lbs.) for various HOB angles. The data in FIG. 10 generally indicates a linear relationship between HOB angle, person weight, and depth of immersion. For example, for a given weight, an individual tends to be immersed to a greater depth within the fluidized particulate material at their sacrum, which depth of immersion increases as the HOB angle increases. This relationship is generally consistent for each weight, though a heavier person will be immersed to a greater depth than a lighter person at any given HOB angle. For example, FIG. 10 shows four separate linear relationships at four respective HOB angles 0°, 30°, 45°, and 60°. A person of 350 lbs. would, for example, be immersed to about 8.1 inches at an HOB angle of 0°, be immersed to about 8.55 inches at an HOB angle of 30°, be immersed to about 8.8 inches at an HOB angle of 45°, and be immersed to about 9.25 inches at an HOB angle of 60°. A lighter person of about 150 lbs. would have a similar increase of the depth of immersion at each increasing HOB angle, though the lighter person would be immersed to a lesser depth. For example, a person of 150 lbs. would be immersed to about 6.5 inches at an HOB angle of 0°, be immersed to about 7.1 inches at an HOB angle of 30°, be immersed to about 7.5 inches at an HOB angle of 45°, and be immersed to about 7.9 inches at an HOB angle of 60°.

Figure 11:
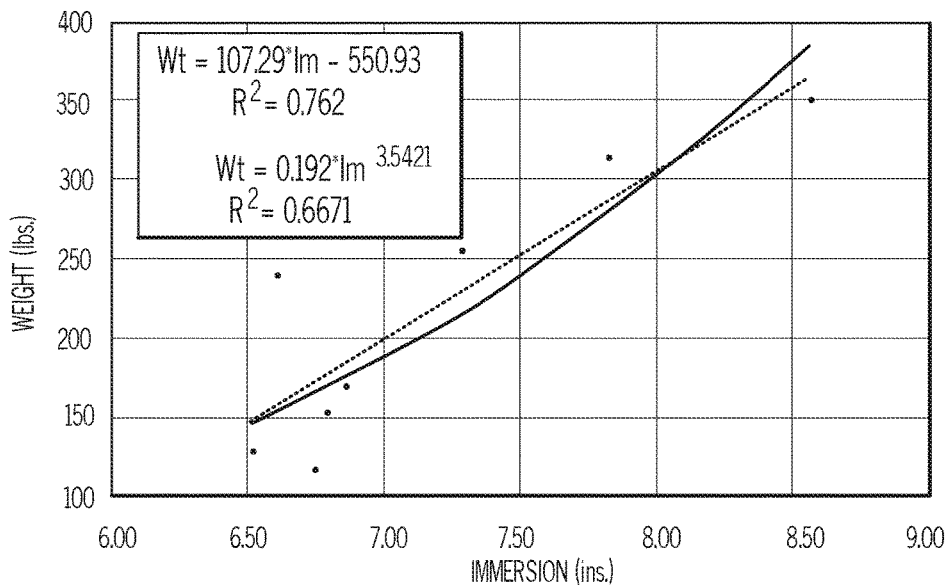
FIG. 11 is a graphical depiction of a regression analysis of data with respect to a HOB angle of 0°, according to one or more embodiments described herein.
Figure 12:
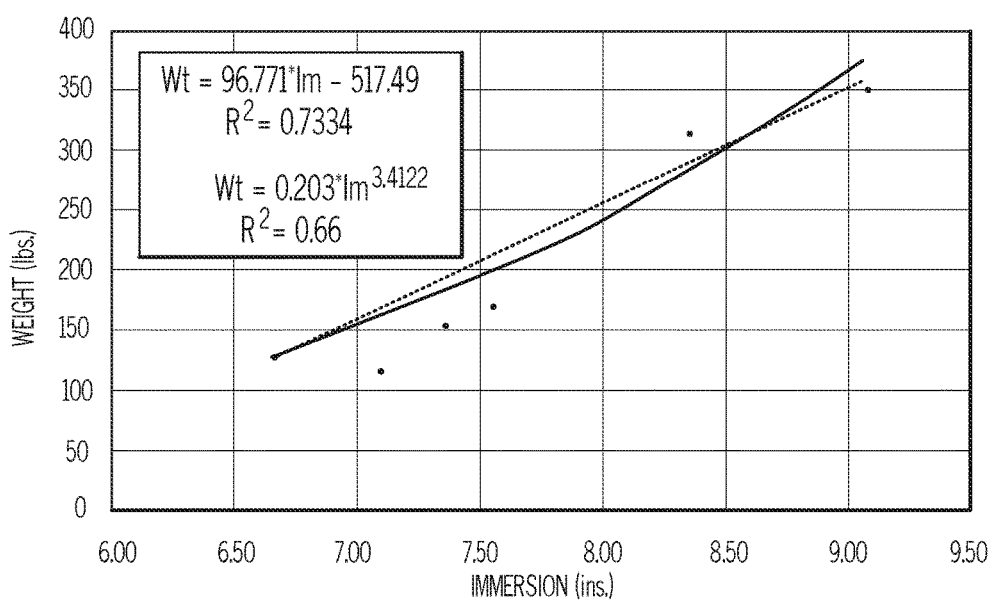
FIG. 12 is a graphical depiction of a regression analysis of data with respect to a HOB angle of 30°, according to one or more embodiments described herein.
Figure 13:
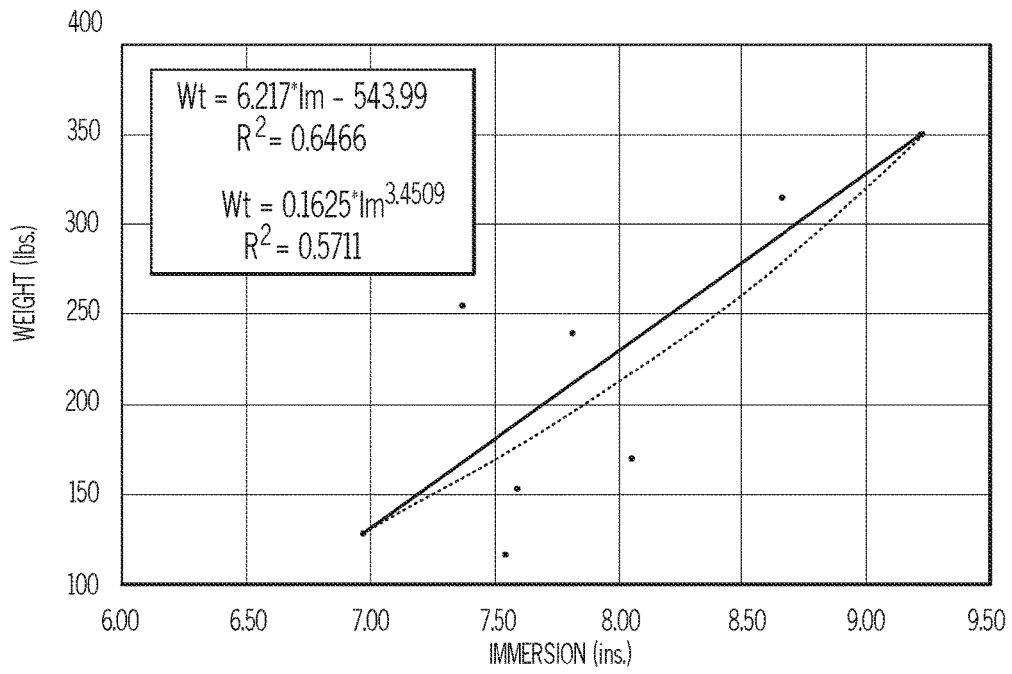
FIG. 13 is a graphical depiction of a regression analysis of data with respect to a HOB angle of 45°, according to one or more embodiments described herein.
Figure 14:
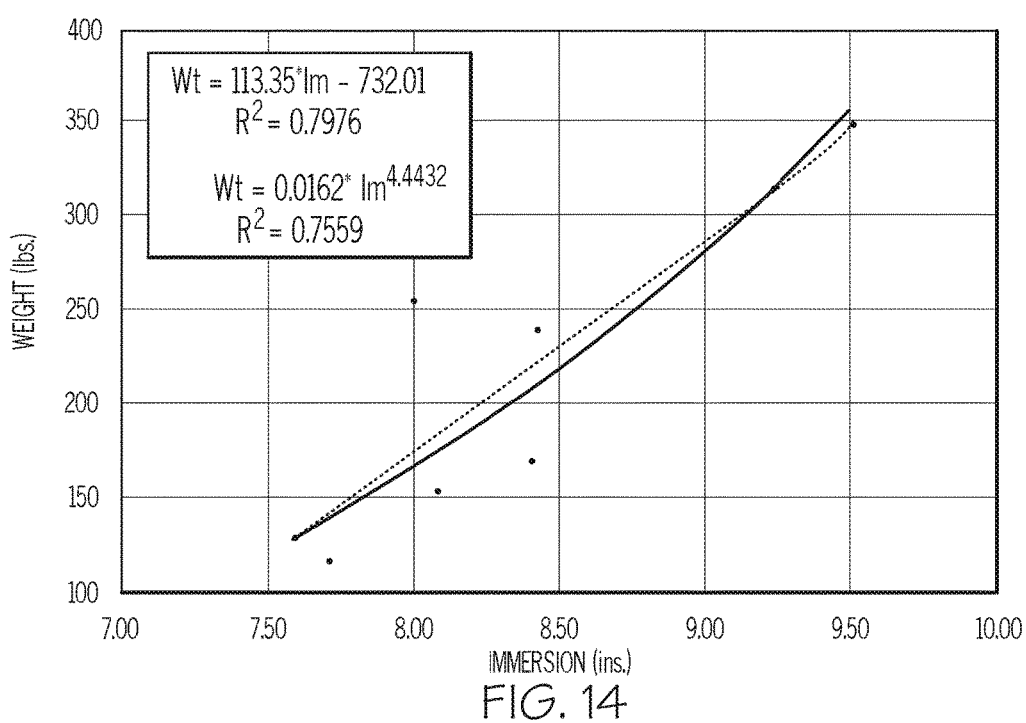
FIG. 14 is a graphical depiction of a regression analysis of data with respect to a HOB angle of 60°, according to one or more embodiments described herein.

FIGS. 11-14 illustrate separate regression analysis studies of immersion (x-axis, in inches) versus weight (y-axis, in lbs.) for HOB angles of 0°, 30°, 45° and 60° based on the data from FIG. 10. For example, FIG. 11 is a graphical depiction of a regression analysis of immersion versus person weight at an HOB angle of 0°, indicating a generally linear relationship between weight and depth of immersion. Assuming that an undesired migration of the fluidized particulate material and bottoming occurs at approximately 9 inches of immersion, extension of the generally linear relationship line of FIG. 11 (which has a slope of about 107.3 lbs./inch) indicates a maximum supportable weight of approximately 420 lbs. before bottoming occurs (at 9 inches). FIG. 12 similarly is a graphical depiction of a regression analysis of immersion versus person weight at an HOB angle of 30°, and extension of the generally linear relationship line of FIG. 12 (which has a slope of about 96.7 lbs./inch) indicates a maximum supportable weight of approximately 359 lbs. before bottoming occurs (at 9 inches). Further, FIG. 13 is a graphical depiction of a regression analysis of immersion versus person weight at an HOB angle of 45°, and extension of the generally linear relationship line of FIG. 13 (which has a slope of about 96.2 lbs./inch) indicates a maximum supportable weight of approximately 320 lbs. before bottoming occurs (at 9 inches). Similarly, FIG. 14 is a graphical depiction of a regression analysis of immersion versus person weight at an HOB angle of 60°, and extension of the generally linear relationship line of FIG. 14 (which has a slope of about 113.3 lbs./inch) indicates a maximum supportable weight of approximately 280 lbs. before bottoming occurs (at 9 inches). Thus, FIGS. 11-14 illustrate that a higher HOB angle generally results in a reduction of the maximum weight that is supportable before there is insufficient fluidized particulate material below the subject and bottoming occurs.

As noted herein, it has been determined that the angular orientation of the upper frame 102 can be adjusted based on the angular orientation of the torso frame 109 and the weight of the person disposed on the person support apparatus 10, 100 to ensure that sufficient particulate material is disposed beneath the person, thereby mitigating the risk of bottoming. Specifically, it has been found that by orienting the upper frame relative to the base frame such that the foot end of the upper frame is at a higher elevation than the head end of the support frame can increase the maximum supportable weight of the person support apparatus irrespective of the HOB angle, as indicated by the following modeled examples. Specifically, Comparative Example 1 and Inventive Example 2 below are based on modeled data derived from the regression analyses graphically depicted in FIGS. 11-14.

COMPARATIVE EXAMPLE 1

Referring now to TABLE 1 presented in FIG. 15, TABLE 1 includes the change (decrease) in the depth of the particulate material (ΔDepth, in inches) and the corresponding change (decrease) in the maximum supportable weight (ΔSupport, in lbs.) as a function of the change in angle of orientation (Δθ, in degrees (°)) of the upper frame with respect to the base frame. In this example, the initial angle between the upper frame and the base frame is unbiased (i.e., 0°) and, hence, the maximum supportable weights for each condition are the same as those described above with respect to FIGS. 11-14. The change in the angle AO presented in TABLE 1 corresponds to the foot end of the upper frame being oriented at a lower elevation than the head end of the support frame. The modeled data assumes an initial bottoming depth of 9 inches for each weight and a sacrum position of 40 inches (i.e., L=40 inches) from the foot end of the fluidized bed (as measured from the interior of the tub portion). The data are presented for HOB angles of 0°, 30°, 45°, and 60°.

The data in TABLE 1 generally indicates that as AO increases, the depth of the particulate material under the sacrum of the subject decreases. This decrease in the depth of the particulate material yields a corresponding decrease in the maximum weight which can be supported on the mattress system of the person support apparatus without bottoming. This trend is consistent for each HOB angle modeled.

As an example, for an HOB angle of 30°, as described above with respect to FIG. 12, bottoming would occur at a maximum supportable weight of 359 lbs when the angle θ is 0°. However, as the angle θ increases, the maximum supportable weight decreases. For example, at a seat above foot bed tilt angle of 0.5°, the change (decrease) in the maximum supportable weight is 33.8 lbs. (i.e., ΔSupport is 33.8 lbs.) Thus, the new maximum supportable weight would be 359 lbs less 33.8 lbs, or 325.2 lbs.

INVENTIVE EXAMPLE 2

A second model was developed similar to the model of Comparative Example 1. However, in contrast to Comparative Example 1, in this example the initial angle between the upper frame and the base frame was biased. Specifically, the head end of the support frame was modeled to have a lower elevation than the foot end of the support frame such that the angle between the support frame and the base frame was −0.25° (head below foot). In this orientation the particulate material had a greater depth under the sacrum of the subject and, hence, the maximum supportable weights increased relative to Comparative Example 1. That is, in Inventive Example 2, the maximum supportable weights were initially 439 lbs., 376 lbs., 336 lbs., and 299 lbs. owing to the initial bias angle.

Further, as in Comparative Example 1, in Inventive Example 2 it was found that as AO increases, the depth of the particulate material under the sacrum of the subject also decreases. This decrease in the depth of the particulate material yields a corresponding decrease in the maximum weight which can be supported on the mattress system of the person support apparatus without bottoming. This trend is consistent for each HOB angle modeled. However, the overall maximum supportable weight for each condition modeled in Inventive Example 2 was generally greater than the maximum supportable weight for the same condition of Comparative Example 1 owing to the initial bias angle.

Thus, based on Inventive Example 2, the angle of the upper frame with respect to the base frame can be adjusted to increase the maximum supportable weight of the person support apparatus thereby reducing the risk of bottoming. Moreover, to ensure that the risk of bottoming is mitigated for a specific person supported on the person support apparatus, the angle of the upper frame with respect to the base frame can be adjusted based on the weight of the person as well as the HOB angle.

Specifically, an angle between the upper frame and the support frame that mitigates the risk of bottoming can be determined based on the weight of the person and the HOB angle utilizing the regression models graphically depicted in FIGS. 10-14. Referring to TABLE 2 of FIG. 16, a mean slope may be determined based on the four linear relationships for each respective HOB angle of 0°, 30°, 45°, and 60° as set forth in FIGS. 10-14. As noted herein, FIG. 10 graphically depicts the four linear relationships plotted on the same axes, and FIGS. 11-14 graphically represent weight (in pounds) as a function of depth of immersion (in inches) according to the specified equations for each HOB angle modeled. For example, FIG. 11 plots a linear relationship associated with an HOB angle of 0° according to the following equation: Weight=107.29*Immersion−550.93. FIG. 12 plots a linear relationship associated with an HOB angle of 30° according to the following equation: Weight=96.771*Immersion−517.49. FIG. 13 plots a linear relationship associated with an HOB angle of 45° according to the following equation: Weight=96.217*Immersion−543.99. Further, FIG. 14 plots a linear relationship associated with an HOB angle of 60° according to the following equation: Weight=113.35*Immersion−732.01. The lines associated with these equations may be manipulated to derive the depth of immersion as a function of weight according to the relationship y=mx+b for each HOB angle (i.e., 0°, 30°, 45°, and 60°), where y is the depth, m is the slope of the line in the corresponding figure, x is the weight of the subject, and b is the y intercept. These equations are set forth in TABLE 2, presented in FIG. 16, for each HOB angle of 0°, 30°, 45° and 60°. The derived slopes of TABLE 2 can be averaged to determine a mean slope of 0.00972 inches per pound. As the equations are derived from the generally parallel linear relationships plotted in FIG. 10 that differ primarily with respect to an intercept, the information from TABLE 2 may be combined into an equation for depth of immersion and a regression performed to determined the intercept coefficient for the equation while using the determined mean slope as a weight coefficient (or rather a constant multiplier for the weight variable in the equation). The intercept is determined via the regression as a function of the HOB angle. The intercept coefficient was determined to be 4.9654 inches and the HOB coefficient was determined to be 0.02025 inches per degree. EQUATION 1 below sets forth the following derived equation (including units in parentheses) in which depth of immersion is a function of weight and HOB angle:

Depth of Immersion (inches)=0.00972 (inches/lb.) *Weight (lbs.)+0.02025 (inches/degree)*HOB angle (degrees)+4.9654 (inches)        EQUATION 1

Based on the foregoing, it should be understood that EQUATION 1 may be utilized to determine the depth of immersion of a person in the particulate material based on the weight of the person and the HOB angle. For example, TABLE 3 of FIG. 17 includes the calculated depth of immersion utilizing EQUATION 1 for different weights and HOB angles based on EQUATION 1. Those calculations were then compared to the depth measurements from the regressions (i.e., FIGS. 10-14 which are derived from empirical data) to determine an error value. As shown in TABLE 3, the error ranges are generally less than 2% indicating good agreement between the empirically derived data and the calculated data. For example, for a weight of 200 pounds at an HOB angle of 30°, EQUATION 1 results in a calculated depth of 6.898 inches. The empirical data from the regressions based on these variables is 7 inches, indicating a relatively small error of 1.47% between the calculated and regression data.

EQUATION 1 can be further modified to account for an additional, offset minimum immersion depth (i.e., an offset depth) to ensure a certain amount of particulate material is present beneath the sacrum of the person. Thus, EQUATION 1 can be rewritten as a target depth of immersion as follows:

Target Depth of Immersion (inches)=0.00972 (inches/lb.)*Weight (lbs.)+0.02025 (inches/degree)*HOB angle (degrees)+4.9654 (inches)+ offset minimum immersion depth (inches)        EQUATION 2

The offset minimum immersion depth may be, for example, 1 inch. However, it should be understood that the offset minimum immersion depth may be greater than or less than 1 inch. In some embodiments, the offset minimum immersion depth may be zero.

The Target Depth of Immersion may be related to a Nominal Depth of Immersion plus L*sin θ to establish a relationship between the tilt angle θ of the upper frame with respect to the base frame and the depth of immersion. Specifically:

Target Depth of Immersion (inches)=Nominal Depth (inches)+L*sin θ        EQUATION 3 where L is the sacrum position as measured from the foot end of the fluidized bed (from the interior portion of the tub portion as depicted in FIG. 7A) and θ is the tilt angle between the upper frame and the base frame such that the head end of the upper frame is positioned lower than the foot end of the support frame. In embodiments, the nominal depth is an assumed constant such as 9 inches depth of immersion, for example, that may or may not include a reference position tilt in a trendelenburg direction.

Based on EQUATION 2, EQUATION 3 can be rewritten as follows:

Nominal Depth (inches)+L*sin θ=0.00972 (inches/lb.)*Weight (lbs.)+0.02025 (inches/degree) *HOB angle (degrees)+4.9654 (inches)+offset minimum immersion depth (inches)        EQUATION 4

EQUATION 4 can then be solved for the tilt angle θ such that:

θ=(1/L)*sin⁻¹ (0.00972 (inches/lb.)*Weight (lbs.)+ 0.02025 (inches/degree)*HOB angle (degrees)+ 4.9654 (inches)+offset minimum immersion depth (inches)−Nominal Depth (inches))        EQUATION 5

Thus, the tilt angle θ between the upper frame and the base frame can be determined based on the weight of the person and the HOB angle using EQUATION 5 to ensure that there is sufficient particulate material (i.e., at least a minimum depth of particulate material) under the sacrum of the person to mitigate bottoming. More specifically, once the tilt angle θ has been determined, the angle between the upper frame with respect to the base frame can be adjusted to the tilt angle θ thereby causing particulate material in the fluidized bed to accumulate beneath the sacrum of the person, reducing the risk of bottoming. In embodiments, the tilt angle θ may be from greater than or equal to 0° and less than or equal to 10.1°. When the tilt angle θ is greater than 0°, the upper support frame is oriented such that a head end of the frame is lower than the foot end (i.e., head below foot). In embodiments, determining the tilt angle of the upper frame with respect to the base frame may include calculating the tilt angle according to the following equation, which is a simplified version of EQUATION 5:

$$\theta = (1/L)*\sin^{-1}(MD-ND) \quad \text{EQUATION 6}$$

With respect to EQUATION 6, θ is the tilt angle, L is indicative of a length between the foot end of the bladder portion and the point of maximum immersion depth, MD is the minimum depth of the fluidized particulate material, and ND is a nominal depth of the fluidized particulate material. Specifically, MD is the minimum depth of the fluidized particulate material as determined through EQUATION 2, or rather MD=0.00972 (inches/lb.)*Weight (lbs.)+0.02025 (inches/degree)*HOB angle (degrees)+4.9654 (inches)+offset minimum immersion depth (inches), where the offset minimum immersion depth may be zero. In embodiments, the minimum depth includes an offset value (e.g., an additional minimum immersion depth of 1 inch).

Accordingly, it should be understood that in some embodiments described herein the orientation of the upper frame with respect to the base frame may be adjusted based on the weight of the patient and, optionally, the HOB angle in order to mitigate bottoming. Referring now to FIGS. 1-2 and 7A-7D, by way of example, in some embodiments, the control box 24 of the person support apparatus 10 receives a signal from the load beams and/or load cells disposed in the base frame 101 of the person support apparatus 10 indicative of the weight of the person positioned on the person support apparatus 10. In addition, the control box 24 receives a signal from an orientation sensor operatively associated with the torso support section 91 of the person support apparatus 10 indicative of the HOB angle (i.e., the angle between the upper frame 102 and the torso frame 109 and/or deck 94). Based on these signals, the control box 24 determines an appropriate tilt angle θ between the upper frame 102 and the base frame 101 such that there is sufficient particulate material in the fluidized bed 112 at the line 700 to prevent the person from bottoming. The tilt angle thus corresponds to a minimum depth of the fluidized particulate material at a point of maximum immersion of the person on the bladder portion 110 of the support surface of the person support apparatus 10. For example, in embodiments, the control box 24 may include a look up table (LUT) of values for the tilt angle θ indexed according to the weight of the person positioned on the person support apparatus 10 and the HOB angle. In other embodiments, the control box 24 may directly calculate the tilt angle θ from, for example, EQUATION 5 or EQUATION 6 described hereinabove.

While the control box 24 has been described herein as receiving signals indicative of the weight of the person and the HOB angle from respective sensors associated with the person support apparatus 10, it should be understood that other embodiments are contemplated and possible. For example, in embodiments, a user, such as a caregiver, may directly input the weight of the person and/or the HOB angle into the control unit using, for example, the GUI of the control box or a related controller (e.g., a pendant controller or the like).

Still referring to FIGS. 1-2 and 7A-7D, once the control box 24 has determined the appropriate tilt angle θ, the control box 24 actuates the foot actuator 111 and/or the head actuator 113 such that the upper frame 102 is oriented at the tilt angle θ with respect to the base frame 101 (i.e., adjusting an angular orientation of the upper frame 102 with respective to the base frame 101 until the upper frame 102 is oriented at the tilt angle θ with respect to the base frame 101). As noted hereinabove, when the upper frame 102 is oriented at the tilt angle θ with respect to the base frame 101, the foot end 120 of the upper frame 102 is positioned at a higher elevation than the head end 122 of the upper frame 102 thereby causing particulate material in the fluidized bed 112 to accumulate in the bladder portion 110 proximate the line 700, providing the minimum depth of fluidized particulate material to prevent bottoming out at the maximum immersion point.

Thus, through the methods and apparatuses described herein, a caregiver and/or person support apparatus 10, 100 may maintain a tilt angle of the bladder portion 110 from a foot end 120 to a head end based 122 on a person's weight and an HOB angle of the torso frame 109 to maintain a predetermined distribution of the fluidized particulate material within the bladder portion 110 of the person support apparatus 100. Further, through the methods and apparatuses described herein, a caregiver and/or person support apparatus 100 may maintain a predetermined distribution of the fluidized particulate material within the bladder portion 110 of the person support apparatus 100 while the person support apparatus 100 is being adjusted either by moving upwards or downwards and/or having its angular orientation changed. By maintaining a distribution of the fluidized particulate material within the bladder portion 110 during such movement and adjustment of the person support apparatus 100, for example, a protective cushion provided by the fluidized particulate material is maintained within the bladder portion 110 beneath the person resting on the person support apparatus 100. Maintaining such a protective cushion prevents bottoming that could be otherwise be caused by a migration of the fluidized particulate material to the foot end 122 of the person support apparatus 100 when the angular orientation of the person support apparatus 100 is beyond a predetermined range.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling an angular orientation of a person support apparatus including a support surface having a bladder portion containing fluidized particulate material configured for migration within the bladder portion along a bottom surface of the bladder portion due to a gravitational pull toward an end of the person support apparatus, an upper frame, and a base frame, the method comprising:
   adjusting a height of the upper frame with respect to the base frame with at least one of a first actuator and a second actuator at respective first and second actuator speeds;
   determining a dynamic angular orientation of the upper frame with respect to the base frame based on at least one of an operating characteristic of the first actuator and an operating characteristic of the second actuator;
   determining a corrected angular orientation based on the dynamic angular orientation and a floor angle, wherein the floor angle is indicative of an orientation of the base frame sensed with respect to horizontal and is generated as a sensed output estimation;
   comparing the corrected angular orientation with an orientation reference range, within which orientation reference range the fluidized particulate material maintains a predetermined depth distribution within the bladder portion to prevent bottoming out, the predetermined depth distribution comprising a layer of fluidized particulate material disposed on the bottom surface of the bladder portion with a first depth at a first end of the bladder portion and a second depth different from the first depth at a second end of the bladder portion such that an angle between the first depth and the second depth is within the orientation reference range; and
   adjusting at least one of the first actuator speed and the second actuator speed when the corrected angular orientation is outside the orientation reference range until the corrected angular orientation is within the orientation reference range.

2. The method of claim 1, wherein the fluidized particulate material contained within the bladder portion of the person support apparatus has the predetermined depth distribution in the bladder portion when the corrected angular orientation is within the orientation reference range.

3. The method of claim 1, further comprising an initial step of determining the floor angle indicative of the orientation of the base frame with respect to horizontal based on a value generated from an inclinometer disposed on the person support apparatus.

4. The method of claim 1, wherein at least one of the first actuator speed and the second actuator speed are adjusted and the dynamic angular orientation is determined as the upper frame transitions with respect to the base frame from a first height to a second height.

5. The method of claim 4, wherein the dynamic angular orientation is determined at least partially based on one or more values generated from at least one of a first potentiometer associated with the first actuator and a second potentiometer associated with the second actuator.

6. The method of claim 1, wherein:
   the orientation reference range is measured relative to a reference position of the person support apparatus; and
   the reference position is at 0.25° such that the person support apparatus is oriented with a foot end of the person support apparatus higher than a head end.

7. The method of claim 1, wherein:
   the orientation reference range is measured relative to a reference position of the person support apparatus; and
   the reference position is in a range from about +0.1° to about −0.5° such that the person support apparatus is oriented with a foot end of the person support apparatus higher than a head end when the reference position is in a negative end of the range.

8. The method of claim 1, wherein:
   the orientation reference range is measured relative to a reference position of the person support apparatus; and
   the orientation reference range is in at least one of the following ranges relative to the reference position:
      a range from about −0.4 to about +0.4° relative to the reference position; and
      a range from about −0.25° to about +0.25° relative to the reference position.

9. A method for controlling an angular orientation of a person support apparatus that includes a support surface having a bladder portion containing fluidized particulate material configured for migration within the bladder portion along a bottom surface of the bladder portion due to a gravitational pull toward an end of the person support apparatus, the method comprising:
   actuating at least one of a first actuator and a second actuator, respectively coupled to the person support apparatus at a first end and a second end, at a respective first actuator speed and a second actuator speed to raise or lower a height of the person support apparatus;
   receiving a first reading indicative of a first angular orientation of the first end of the person support apparatus with respect to the second end and relative to horizontal, wherein the first reading is at least generated from a first sensor and a second sensor respectively associated with the first actuator and the second actuator;
   determining a corrected first reading indicative of the first angular orientation based on the first reading and a calibration of the person support apparatus configured to generate a sensed output estimation of an orientation of the person support apparatus with respect to horizontal;
   comparing the corrected first reading and an orientation reference range within which orientation reference range the fluidized particulate material maintains a predetermined depth distribution within the bladder portion to prevent bottoming out, the predetermined depth distribution comprising a layer of fluidized particulate material disposed on the bottom surface of the bladder portion with a first depth at a first end of the bladder portion and a second depth different from the first depth at a second end of the bladder portion such that an angle between the first depth and the second depth is within the orientation reference range; and
   actuating at least one of the first actuator and the second actuator automatically at a different speed when the corrected first reading is outside the orientation reference range until an adjusted corrected first reading indicative of an adjusted first angular orientation is within the orientation reference range.

10. The method of claim 9, wherein the fluidized particulate material contained within the bladder portion of the person support apparatus has the predetermined depth distribution in the bladder portion when the corrected first reading is within the orientation reference range.

11. The method of claim 9, wherein:
   the first end comprises a foot end;
   the second end comprises a head end; and
   the orientation reference range is measured relative to a reference position of the person support apparatus; and
   the reference position is at 0.25° such that the person support apparatus is oriented with the foot end of the person support apparatus higher than the head end.

12. The method of claim 9, wherein the orientation reference range is in a range from about −0.4° to about +0.4° relative to a reference position.

13. The method of claim 9, further comprising calibrating the person support apparatus to generate the calibration, the calibrating comprising:
calculating, automatically with an inclinometer, a floor angle associated with the person support apparatus relative to horizontal to generate the sensed output estimation of the orientation of the person support apparatus with respect to horizontal.

14. The method of claim 9, wherein:
the first reading is generated from at least one of a first potentiometer associated with the first actuator and a second potentiometer associated with the second actuator; and
the method further comprises calibrating the person support apparatus to generate the calibration, the calibrating comprising calculating, automatically with an inclinometer, a floor angle associated with the person support apparatus relative to horizontal; and
determining the corrected first reading comprises calculating the corrected first reading based on the first reading and the floor angle.

15. The method of claim 14, further comprising:
receiving input from at least one of the first potentiometer and the second potentiometer respectively in at least one of a first PID controller and a second PID controller;
outputting at least one of a first actuator drive signal from the first PID controller and a second actuator drive signal from the second PID controller; and
repeating the receiving and outputting steps until the adjusted corrected first reading indicative of the adjusted first angular orientation is within the orientation reference range.

16. The method of claim 9, wherein:
the first reading is at least partially generated from a first potentiometer associated with the first actuator and a second potentiometer associated with the second actuator; and
actuating at least one of the first actuator and the second actuator comprises outputting a stroke length signal related to a stroke length for the respective first and second actuators, wherein the stroke length of the first actuator is an input with respect to the first potentiometer and the stroke length of the second actuator is an input with respect to the second potentiometer.

17. The method of claim 16, further comprising:
receiving the respective stroke lengths for the first and second actuators associated with the corrected first reading as a respective input in at least one of a first PID controller and a second PID controller;
outputting at least one of a first actuator drive signal from the first PID controller and a second actuator drive signal from the second PID controller; and
repeating the receiving and outputting steps until the adjusted corrected first reading indicative of the adjusted first angular orientation is within the orientation reference range.

18. The method of claim 9, wherein the first actuator is incremented at a first duty cycle speed that is at least double a second duty cycle speed at which the second actuator is incremented.

19. The method of claim 18, wherein the first duty cycle speed is at a 10% pulse-width-modulation and the second duty cycle speed is at a 5% pulse-width-modulation.

20. A system for controlling an angular orientation of a person support apparatus that includes a support surface having a bladder portion containing fluidized particulate material configured for migration within the bladder portion along a bottom surface of the bladder portion due to a gravitational pull toward an end of the person support apparatus, the system comprising:
at least a first actuator associated with a head end as a first end and a second actuator associated with a foot end as a second end of the person support apparatus; and
an electronic control unit comprising a processor communicatively coupled to a non-transitory computer storage medium, wherein the non-transitory computer storage medium stores instructions that, when executed by the processor, cause the processor to:
actuate at least one of the first actuator and the second actuator at a respective first actuator speed and a second actuator speed to raise or lower a height of the person support apparatus;
receive, automatically with the electronic control unit, a first reading indicative of a first angular orientation of the first end of the person support apparatus with respect to the second end and relative to horizontal, wherein the first reading is generated from a first sensor and a second sensor respectively associated with the first actuator and the second actuator;
determine, automatically with the electronic control unit, a corrected first reading indicative of the first angular orientation based on the first reading and a calibration of the person support apparatus configured to generate a sensed output estimation of an orientation of the person support apparatus with respect to horizontal;
compare, automatically with the electronic control unit, the corrected first reading and an orientation reference range, within which orientation reference range the fluidized particulate material maintains a predetermined depth distribution within the bladder portion to prevent bottoming out, the predetermined depth distribution comprising a layer of fluidized particulate material disposed on the bottom surface of the bladder portion with a first depth at a first end of the bladder portion and a second depth different from the first depth at a second end of the bladder portion such that an angle between the first depth and the second depth is within the orientation reference range; and
actuate at least one of the first actuator and the second actuator, automatically with the electronic control unit, at a different speed when the corrected first reading is outside the orientation reference range until an adjusted corrected first reading indicative of an adjusted first angular orientation is within the orientation reference range.

* * * * *